(12) United States Patent
Kim

(10) Patent No.: US 11,024,085 B2
(45) Date of Patent: *Jun. 1, 2021

(54) ELECTRONIC SYSTEM AND METHOD FOR THREE-DIMENSIONAL MIXED-REALITY SPACE AND EXPERIENCE CONSTRUCTION AND SHARING

(71) Applicant: DOUBLEME, INC, San Jose, CA (US)

(72) Inventor: Heekwan Kim, San Jose, CA (US)

(73) Assignee: DOUBLEME, INC., San Jose, CA (US)

(*) Notice: Subject to any disclaimer, the term of this patent is extended or adjusted under 35 U.S.C. 154(b) by 236 days.

This patent is subject to a terminal disclaimer.

(21) Appl. No.: 16/177,319

(22) Filed: Oct. 31, 2018

(65) Prior Publication Data

US 2019/0073831 A1 Mar. 7, 2019

Related U.S. Application Data

(63) Continuation-in-part of application No. 15/206,255, filed on Jul. 9, 2016, now Pat. No. 10,516,868.

(51) Int. Cl.
*G06T 19/00* (2011.01)
*G03H 1/22* (2006.01)
(Continued)

(52) U.S. Cl.
CPC ......... *G06T 19/006* (2013.01); *G03H 1/0005* (2013.01); *G03H 1/2202* (2013.01);
(Continued)

(58) Field of Classification Search
CPC .......... G03H 1/2249; G03H 2001/228; G03H 1/0005; G11B 7/0065; G06T 19/006; G06F 3/011
See application file for complete search history.

(56) References Cited

U.S. PATENT DOCUMENTS 10,210,661 B2 * 2/2019 Kohler ................. G06T 19/006
2017/0307888 A1 * 10/2017 Kohler ............... G02B 27/0093
(Continued)

*Primary Examiner* — Boubacar Abdou Tchoussou
(74) *Attorney, Agent, or Firm* — Invent Capture, LLC.; Samuel S. Cho

(57) ABSTRACT

A novel 3D mixed-reality space and experience construction sharing system is configured to provide a novel part-holographic and part-physical object-based immersive user experience environment that enables an intermixture of computer-generated lifelike holographic objects and real objects to be synchronized and correlated to a particular physical space (i.e. as a "mixed-reality" (MR) environment) for vividly-interactive user experiences during a user's visit to the particular physical space. Moreover, the novel 3D mixed-reality space and experience construction sharing system accommodates a user interaction designer to construct and configure a mixed-reality (MR) environment and various potential user interactivities for a geographic landmark, a museum, or another tourist destination, and subsequently share the MR environment with other user interaction designers and users (e.g. tourists) who visit that tourist destination. Typically, the MR environment is visualized through a head-up display device or another portable electronic device executing an MR environment-visualization mobile application.

11 Claims, 10 Drawing Sheets

A Process Flow Diagram for a 3D Mixed-Reality Space & Experience Construction Sharing System (i.e. "HoloWalks")

(51) Int. Cl.
*G11B 7/0065* (2006.01)
*G03H 1/00* (2006.01)
*G06F 3/01* (2006.01)

(52) U.S. Cl.
CPC .......... *G03H 1/2249* (2013.01); *G06F 3/011* (2013.01); *G06F 3/012* (2013.01); *G06F 3/017* (2013.01); *G11B 7/0065* (2013.01); *G03H 2001/2284* (2013.01); *G03H 2210/30* (2013.01)

(56) References Cited

U.S. PATENT DOCUMENTS

| | | | |
|---|---|---|---|
| 2018/0321894 A1* | 11/2018 | Paulovich | G03H 1/2249 |
| 2019/0116136 A1* | 4/2019 | Baudart | H04L 63/1433 |
| 2019/0201806 A1* | 7/2019 | Weston | G06F 3/04883 |
| 2019/0253638 A1* | 8/2019 | Wen | H04N 9/04 |
| 2019/0369742 A1* | 12/2019 | Ghazanfari | G06F 3/017 |

* cited by examiner

100

A Process Flow Diagram for a 3D Mixed-Reality Space & Experience Construction Sharing System
(i.e. "HoloWalks")

200

A System Block Diagram for a 3D Mixed-Reality Space & Experience Construction Sharing System
(i.e. "HoloWalks")

A HoloWalks Creator Walks Through a Physical Space and 3D Mapping is Automatically Performed by the HoloWalks System A HoloWalks Creator Selects a Desired Spot within the 3D Map in a Mixed-Reality Visual Interface to Initiate a Mix-Reality Holographic Guide Content Creation A HoloWalks Creator Places Holographic Contents and Overlays User Interaction Elements within the 3D Map in the Mixed-Reality Visual Interface in the HoloWalks system A User Interacts with a Holographic Guide and/or Contents in a Mixed Reality Environment Provided by a HoloWalks Viewer A Parisian Holographic Mixed-Reality (HMR) Tour Guide Application Utilizing the 3D Mixed-Reality Space & Experience Construction Sharing System (i.e. "HoloWalks")

500

An Example of Multiple Mixed-Reality Artificial Layers Superimposed on a Physical Space for Construction of a Mixed-Reality Application from the 3D Mixed-Reality Space & Experience Construction Sharing System (i.e. "HoloWalks")

600A

Mixed-Reality (MR) Application Example (Step 1): User Perceives Physical Objects in a Physical Space

600B

MR Application Example (Step 2): MR Exp. Designer Wears a Head-Mounted Display (HMD) in the Same Physical Space to Initiate MR Content Creation MR Application Example (Step 3): the HoloWalks System Enables Automated Intelligent 3D Mapping of the Physical Space via HMD Space Scanning by the MR Exp. Designer MR Application Example (Step 4): the HoloWalks System Completes User Glare-Invoked Intelligent 3D Mapping of the Physical Space MR Application Example (Step 5): the HoloWalks System Creates Virtual Coordinates on Mixed-Reality Artificial Layer(s) in Preparation of MR Exp. Designer's MR Content Synthesis MR Application Example (Step 6): MR Exp. Designer's Selects and Directs MROs and Interactions in the MR Artificial Layer(s) Intertwined with Physical Objects and Physical Space MR Application Example (Step 7): MR Exp. Designer's Places and Directs More MROs and Interactions in the MR Artificial Layer(s) Intertwined with Physical Objects and Physical Space MR Application Example (Step 8): Place and Direct More MROs, MRH Humans, and Interactions in the MR Artificial Layer(s) Intertwined with Physical Objects and Physical Space MR Application Example (Step 9): MR Experience Viewer Equipped with HMD Engages in Lifelike Intertwined Visualization of MROs, MRHs, and Physical Objects in the Same Physical Space MR Application Example (Step 10): MR Experience Viewer While Not Wearing the HMD Only Sees Physical Objects in the Same Physical Space

ELECTRONIC SYSTEM AND METHOD FOR THREE-DIMENSIONAL MIXED-REALITY SPACE AND EXPERIENCE CONSTRUCTION AND SHARING

INCORPORATION BY REFERENCE

A US non-provisional patent application, U.S. Ser. No. 15/206,255, titled "HoloPortal and HoloCloud System and Method of Operation," and filed on Jul. 9, 2016, is incorporated herein by reference. The present invention is also a continuation-in-part application of U.S. Ser. No. 15/206,255 and thus claims benefit to U.S. Ser. No. 15/206,255.

BACKGROUND OF THE INVENTION

The present invention generally relates to immersive mixed-reality visualization of real physical and holographic elements in a designated real physical space. More specifically, the present invention relates to three-dimensional mixed-reality space and experience construction and sharing that intertwine real physical objects and synthetic lifelike holographic objects for immersive user interactions within the designated real physical space.

Furthermore, the present invention also relates to creating a holographic tour guide immersed in a real physical tourist landmark with real physical objects to provide prespecified interactive experiences with tourists. In addition, the present invention also relates to intelligent and automated machine mapping of a three-dimensional physical space for creation of a mixed-reality artificial layer and virtual coordinates that are subsequently superimposed on the three-dimensional physical space for mixed-reality space and experience construction by a mixed-reality expert designer.

Virtual reality (VR) and augmented reality (AR) applications are gaining increasing popularity and relevance in electronic user applications. For example, VR headsets for computers and portable devices are able to provide interactive and stereoscopic gaming experiences, training simulations, and educational environments for users wearing the VR headsets. In another example, augmented reality (AR) mobile applications are designed to add texts, descriptions, or added (i.e. "augmented") digitized materials to physical objects if a user wears AR goggles or utilizes AR-compatible mobile applications executed in portable devices. For one of ordinary skill in the art, virtual reality (VR) refers to a completely computer-generated synthetic environment with no direct correlations to a real physical space or a real physical object, while augmented reality (AR) refers to descriptive digital materials that are displayed next to a machine-recognized real physical object to add or "augment" more information to the physical reality.

However, conventional VR and AR applications are unable to provide seamless integration of ultra-high resolution and lifelike holographic three-dimensional objects juxtaposed to real physical objects located in a particular physical location for interactive and immersive curation with both synthetic and real objects, because the conventional VR applications merely provide user interactions in a purely computer-generated synthetic (i.e. virtual) environment with no correlation to physical objects in a real physical space, while the conventional AR applications merely provide additional informational overlays (i.e. information augmentation) to machine-recognized real physical objects via partially-transparent AR goggles or AR-enabled camera applications in mobile devices.

Therefore, it may be beneficial to provide a novel electronic system that enables an intermixture of computer-generated lifelike holographic objects and real objects that are synchronized and correlated to a particular physical space (i.e. as a "mixed-reality" (MR) environment) for immersive user interactions during the user's visit to the particular physical space. Furthermore, it may also be beneficial to provide a novel electronic system that accommodates a user interaction designer to construct and configure a mixed-reality (MR) environment and various potential user interactivities for a geographic landmark, a museum, or another tourist destination, and subsequently share the MR environment with other user interaction designers and users (e.g. tourists) who visit that tourist destination.

SUMMARY

Summary and Abstract summarize some aspects of the present invention. Simplifications or omissions may have been made to avoid obscuring the purpose of the Summary or the Abstract. These simplifications or omissions are not intended to limit the scope of the present invention.

In a preferred embodiment of the invention, a novel three-dimensional (3D) mixed-reality space and experience construction sharing system is disclosed. This system comprises: (1) a dedicated physical studio space for 3D hologram generation, wherein the dedicated physical studio space includes a center stage, a plurality of cameras surrounding the center stage, and a 3D reconstruction electronic system integrating a memory unit and at least one of a CPU and a GPU, wherein the 3D reconstruction electronic system is configured to capture, calculate, reconstruct, and generate graphical transformation of a target object to create a user-controllable 3D holographic object; (2) a head-mounted display device connected to the 3D reconstruction electronic system; (3) a walk-through map creation engine and a 3D map database executed in a computer server connected to the 3D reconstruction electronic system and one or more portable electronic devices utilized by a mixed-reality experience designer and a mixed-reality experience viewer, wherein the walk-through map creation engine intelligently and automatically generates a 3D map of a designer-specified physical space with a mixed-reality artificial layer incorporating virtual coordinates correlated to the designer-specified physical space, when the mixed-reality experience designer walks through the designer-specific physical space while wearing the head-mounted display device connected to the walk-through map creation engine, and wherein the 3D map newly constructed by the walk-through map creation engine is subsequently stored in the 3D map database; (4) a user experience choreography engine and a 3D holographic database executed in the computer server, wherein the user experience choreography engine allows the mixed-reality experience designer to retrieve the 3D map from the 3D map database and select, position, and choreograph the user-controllable 3D holographic object retrieved from the 3D holographic database within the virtual coordinates of the mixed-reality artificial layer, which is graphically superimposed on the designer-specified physical space; (5) a mixed-reality experience designer creator module containing a mixed-reality experience construction interface, which is executed and displayed on the one or more portable electronic devices utilized by the mixed-reality experience designer to construct mixed-reality experience scenarios for the mixed-reality experience viewer, wherein the mixed-reality experience designer module is connected to the walk-through map creation engine, the 3D map database, the user experience choreography engine, and the 3D holographic database; and (6) a mixed-reality experience viewer module connected to the mixed-reality experience designer creator module, and containing a viewer's mixed-reality visualization interface executed and displayed by the one or more portable electronic devices utilized by the mixed-reality experience viewer, wherein the mixed-reality experience viewer immerses in a mixed-reality environment that intermixes the user-controllable 3D holographic object on the virtual coordinates of the mixed-reality artificial layer with one or more physical objects present in the designer-specified physical space.

DETAILED DESCRIPTION

Figure 1:
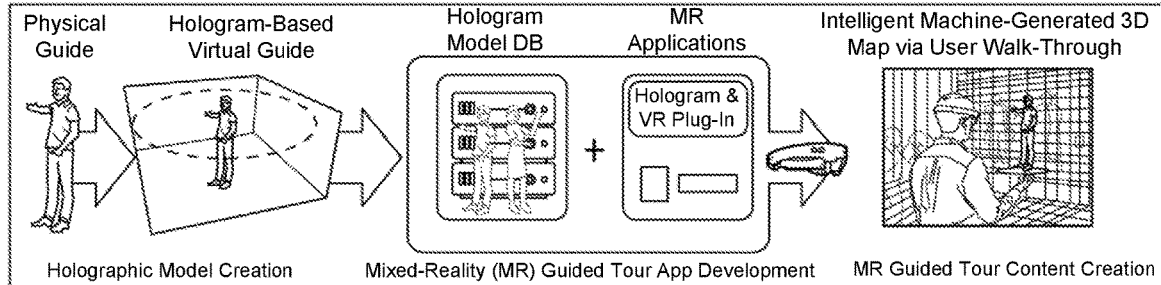
FIG. 1 shows a process flow diagram for a three-dimensional (3D) mixed-reality space and experience construction sharing system (i.e. the "HoloWalks" system), in accordance with an embodiment of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

The detailed description is presented largely in terms of description of shapes, configurations, and/or other symbolic representations that directly or indirectly resemble one or more electronic systems and methods for three-dimensional mixed-reality space and experience construction and sharing. These process descriptions and representations are the means used by those experienced or skilled in the art to most effectively convey the substance of their work to others skilled in the art.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment. Furthermore, separate or alternative embodiments are not necessarily mutually exclusive of other embodiments. Moreover, the order of blocks in process flowcharts or diagrams representing one or more embodiments of the invention do not inherently indicate any particular order and do not imply any limitations in the invention.

One objective of an embodiment of the present invention is to provide a novel electronic system that enables an intermixture of computer-generated lifelike holographic objects and real objects that are synchronized and correlated to a particular physical space (i.e. as a "mixed-reality" (MR) environment) for immersive and vividly-interactive user experiences during the user's visit to the particular physical space.

Furthermore, another objective of an embodiment of the present invention is to provide a novel electronic system that accommodates a user interaction designer to construct and configure a mixed-reality (MR) environment and various potential user interactivities for a geographic landmark, a museum, or another tourist destination, and subsequently share the MR environment with other user interaction designers and users (e.g. tourists) who visit that tourist destination. In context of various embodiments of the invention, this user interaction designer is referred to as a "mixed-reality (MR) experience designer" for a three-dimensional mixed-reality space and experience construction sharing system (i.e. the "HoloWalks" system).

In addition, another objective of an embodiment of the present invention is to provide a method of operating the three-dimensional mixed-reality space and experience construction sharing system (i.e. the "HoloWalks" system) for MR experience designers and MR experience viewers (e.g. tourists, visitors, etc.) at a particular geographic landmark, a museum, or another tourist destination.

For the purpose of describing the invention, a term referred to as "mixed reality," or "MR," as an acronym, is defined as an intermixture of computer-generated lifelike holographic objects and real physical objects that are synchronized and correlated to a particular physical space for immersive user interactions during the user's visit to the particular physical space. Typically, unlike conventional augmented reality applications, the computer-generated lifelike holographic objects are ultra high-resolution (e.g. 4K/UHD) or high-resolution (e.g. HD quality or above) three-dimensional synthetic objects that are intermixed and/or juxtaposed to real physical objects, wherein a viewer immersed in the mixed-reality environment is often unable to distinguish the synthetic nature of the computer-generated lifelike holographic objects and the real physical objects provided by the mixed-reality environment. The viewer immersed in the mixed-reality environment is typically required to be present at the particular physical space correlated and synchronized with the computer-generated lifelike holographic objects and the real physical objects in one or more mixed-reality artificial layers superimposed on the particular physical space. Furthermore, in a preferred embodiment of the invention, the viewer is also required to wear a head-mounted display (HMD) device or at least utilize a mobile electronic device configured to execute a mixed-reality mobile application, in order to experience the mixed-reality environment.

Furthermore, for the purpose of describing the invention, a term referred to as "HoloWalks" is defined as a novel electronic system that provides, executes, enables, and manages a three-dimensional (3D) mixed-reality (MR) space with at least one MR artificial layer superimposed on a physical space, a mixed-reality (MR) experience construction conceived by an MR experience designer (i.e. a user interaction choreography designer), and a 3D MR experience sharing with tourists, visitors, and other users who visit the physical space while wearing a head-mounted display device or utilizing an MR-enabled mobile application executed on a mobile device.

In addition, for the purpose of describing the invention, a term referred to as a "mixed-reality artificial layer" is defined as a computer-generated graphics layer in which mixed-reality objects (MROs) and mixed-reality holographic human guides or curators are created and positioned by a 3D mixed-reality space and experience construction sharing system onto virtual coordinates, which correlate to a particular physical space of a viewer's interest, such as a tourist destination, a museum, or an exhibition venue.

Moreover, for the purpose of describing the invention, a term referred to as "hologram" is defined as a three-dimensional holographic object configured to be displayed from a head-mounted display (HMD) device, a mobile device executing a mixed-reality visual mobile application, or another electronic device with a visual display unit. Typically, a hologram is capable of being animated as a three-dimensional element over a defined period of time. Examples of holograms utilized mixed-reality environments generated by a 3D mixed-reality space and experience construction sharing system include, but are not limited to, a humanized holographic tour guide, a humanized museum curator, a humanized travel assistant, a mixed-reality object (MRO), or another mixed-reality hologram, which can be intermixed with or juxtaposed to physical objects for seamlessly-vivid visualizations of both artificial holograms and physical objects.

In addition, for the purpose of describing the invention, a term referred to as "three-dimensional model," or "3D model," is defined as one or more computer-generated three-dimensional images, videos, or holograms. In a preferred embodiment of the invention, a computerized 3D model is created as a hologram after multi-angle video data are extracted, transformed, and reconstructed by three-dimensional graphics processing algorithms executed in a computer system or in a cloud computing resource comprising a plurality of networked and parallel-processing computer systems. The computer-generated 3D model can then be utilized as a mixed-reality object (MRO) or a humanized mixed-reality hologram (MRH) in a mixed-reality artificial layer superimposed on a particular physical space correlated by virtual coordinates from a 3D mixed-reality space and experience construction sharing system.

Moreover, for the purpose of describing the invention, a term referred to as "cloud" is defined as a scalable data network-connected and/or parallel-processing environment for complex graphics computations, transformations, and processing. The data network-connected and/or parallel-processing environment can be provided using a physical connection, a wireless connection, or both. For example, a cloud computing resource comprising a first cloud computing server, a second cloud computing server, and/or any additional number of cloud computing servers can each extract and transform a portion of multi-angle video data simultaneously as part of a scalable parallel processing algorithm, which performs temporal, spatial, and photometrical calibrations, and executes depth map computation, voxel grid reconstruction, and deformed mesh generation. A scalable number of cloud computing servers enables a real-time or near real-time transformation and reconstruction of 3D models after consumer video recording devices transmit multi-angle video data to the cloud computing resource.

Furthermore, for the purpose of describing the invention, a term referred to as "HoloPortal" is defined as a 3D model creation studio that incorporates cameras positioned on a multiple number of angles around a stage, where a target object is placed for video footage recording at the multiple number of angles around the stage. The 3D model creation studio also typically incorporates a real-time or near real-time 3D reconstruction electronic system, which is configured to perform silhouette extractions, 3D voxel generation, 3D mesh generation, and texture and detail-adding operations to create a user-controllable three-dimensional model that resembles the target object.

In addition, for the purpose of describing the invention, a term referred to as "HoloCloud" is defined as a novel electronic system that captures live multi-angle video feeds of a target object with portable electronic devices and generates a user-controllable three-dimensional model by performing various 3D reconstruction calculations and procedures in a scalable cloud computing network. In one example, a HoloCloud system comprises a plurality of common consumer-level video recording devices (e.g. smartphones, camcorders, digital cameras, etc.) positioned in various angles surrounding a target object (e.g. a human, an animal, a moving object, etc.), a scalable number of graphic processing units (GPU's) in a scalable cloud computing platform, a 3D pre-processing module, a 3D reconstruction module, a background 3D graphics content, a 360-degree virtual reality or video content, and a dynamic 3D model created by the 3D reconstruction module. In one embodiment, the 3D pre-processing module and the 3D reconstruction modules are graphics processing software executed in the scalable number of graphic processing units (GPU's). In another embodiment, these modules may be hard-coded specialized semiconductor chipsets or another hardware that operate in conjunction with the GPU's to provide 3D processing and reconstruction.

FIG. 1 shows a process flow diagram (100) for a three-dimensional (3D) mixed-reality space and experience construction sharing system (i.e. the "HoloWalks" system), in accordance with an embodiment of the invention. As illustrated by the process flow diagram (100), the first step in the 3D mixed-reality space and experience construction sharing for the HoloWalks system involves creation of a computer graphics-generated holographic tour guide, or a "hologram-based virtual guide" as labeled in FIG. 1, from a physical person (i.e. a real human tour guide, a real human museum curator, or another real human presenter).

In a preferred embodiment of the invention, this holographic tour guide is created from a HoloPortal studio and/or a HoloCloud system, which are configured to capture, synthesize, and transform various real-life objects and humanized figures into holographically-displayable datasets that can be utilized in creation of various mixed-reality objects (MROs) and mixed-reality holograms (MRHs) that can be subsequently intermixed with or positioned next to physical objects in a partially computer-generated mixed-reality environment, when viewed from a head-mounted display or another mixed-reality viewing-enabled portable display device in a particular physical space of a popular travel destination by a tourist, a visitor, or another user. The holographic tour guide is typically an animated 3D hologram over an experience designer-defined timeframe, which is called herein as a "4D" (i.e. four-dimensional) holographic content in the HoloWalks system to account for the extra dimension of holographic animation time, in addition to x, y, and z coordinates comprising the three dimensions of the 3D hologram itself.

Figure 2:
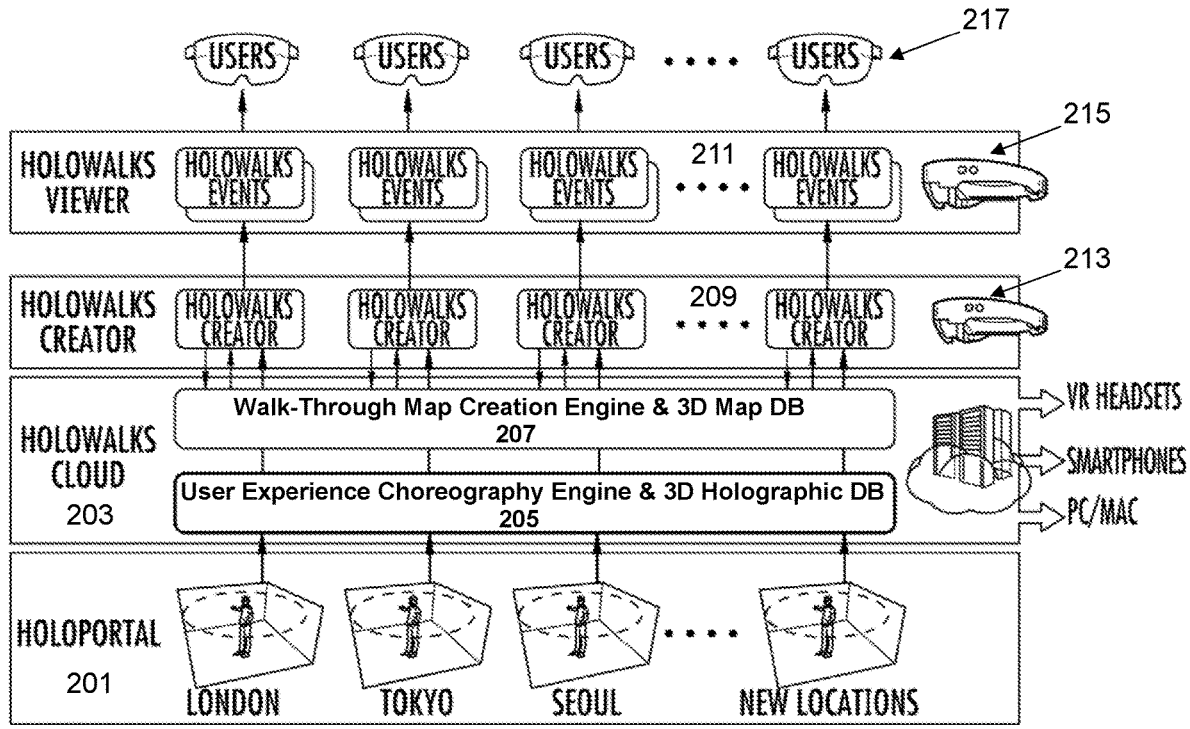
FIG. 2 shows a system block diagram for a three-dimensional (3D) mixed-reality space and experience construction sharing system (i.e. the "HoloWalks" system), in accordance with an embodiment of the invention.

In one example, the holographic tour guide creation is computer graphics-generated and executed by a holographic image capture studio, such as the HoloPortal system (e.g. 201 in FIG. 2), which is configured to capture a plurality of multi-angle images of a real-life human model (e.g. a "physical guide" in FIG. 1) and generate a digitized holographic model content (e.g. a "hologram-based virtual guide), as shown in FIGS. 1 and 2. In the preferred embodiment of the invention, the creation of the digitized holographic model content involves eight or more time-synchronized multiple angle image captures of a targeted object, such as the real-life human model or another real-life object undergoing 3D hologram transformations, to become a computer graphics-based mixed-reality object (MRO) or a mixed-reality hologram (MRH). The HoloPortal component (e.g. 201 in FIG. 2) in the Holowalks system then executes a volumetric conversion of the eight or more time-synchronized multiple angle image captures to create the digitized holographic model content, which can be controlled and choreographed as a hologram by a mixed-reality experience designer or another user interaction choreography director that utilizes a HoloWalks creator module (e.g. 209 in FIG. 2) connected to a walk-through map creation engine and 3D map database (e.g. 207 in FIG. 2) and a user experience choreography engine and 3D holographic database (e.g. 205 in FIG. 2) in the 3D mixed-reality space and experience construction sharing system (i.e. the HoloWalks system), as shown in FIGS. 1 and 2.

Preferably, the HoloPortal (e.g. 201 in FIG. 2) or another holographic image capture studio is a component of the 3D mixed-reality space and experience construction sharing system (i.e. the HoloWalks system). As shown in FIG. 1, the HoloWalks system incorporates a mixed-reality (MR) guided tour application development process, which involves creating and managing a hologram model database and mixed-reality (MR) applications that incorporate holograms and virtual reality plug-in components. The virtual reality plug-in components in MR applications, with user experience designer-selected hologram models and objects, enables 3D mixed-reality space and experience construction to generate a graphically-immersive and interactive mixed-reality environment for mixed-reality guided tour content creations, which are typically superimposed as a mixed-reality artificial layer on a particular physical location (e.g. a popular tourist spot, a museum exhibit, etc.).

In the preferred embodiment of the invention, the MR guided tour application development process, as shown in the process flow diagram (100) in FIG. 1, also involves proprietary or standardized holographic data compression of the digitized holographic model content (e.g. holographic tour guides, holographic museum curators, MROs, MRHs, etc.). In one example, the digitized holographic model content can be compressed and sub-divided as an object (OBJ) file and a digital asset exchange (DAE) file, wherein the OBJ file contains compressed multi-angle graphics data representing a particular holographic model, and wherein the DAE file contains digital graphics compatibility schemes and/or information, typically based on COLLADA (collaborative design activity) XML schema or another industry-standardized graphics compatibility scheme.

Then, the compressed holographic model content files (e.g. OBJ and DAE files) can be utilized by one or more holographic app and service toolkits, such as WebGL, Unity, and Unreal Engine, by HoloWalks content creators/mixed-reality experience designers to envision, generate, modify, and manage a variety of HoloWalks applications and service offerings. In one embodiment, the holographic app and service toolkits may be integrated into or operatively connected to a user experience choreography engine and a walk-through map creation engine in a HoloWalks Cloud module (e.g. 203 in FIG. 2) in the HoloWalks system. In another embodiment, the holographic app and service toolkits may also be partially incorporated into a HoloPortal component (e.g. 201 in FIG. 2) and/or a HoloWalks Creator module (e.g. 209 in FIG. 2), wherein the HoloWalks Creator module utilizes the user experience choreography engine and the walk-through map creation engine in the HoloWalks Cloud module to provide an MR experience construction interface (e.g. FIGS. 3A~3C) to an MR experience designer to enable intelligent machine-generated 3D map via user walk-through and choreographed MR guided tour content creation, as illustrated in the process flow diagram (100) in FIG. 1 and further elaborated in FIG. 2, FIGS. 3A~3C, and FIGS. 6C~6H.

FIG. 2 shows a system block diagram (200) for a three-dimensional (3D) mixed-reality space and experience construction sharing system (i.e. the "HoloWalks" system), in accordance with an embodiment of the invention. In a preferred embodiment of the invention, the HoloWalks system includes a dedicated holographic image capture studio (i.e. a HoloPortal (201)). The HoloWalks system may contain a plurality of HoloPortal studios that are physically constructed, activated, and connected to the HoloWalks system from various locations around the world, as illustrated by various HoloPortals in London, Tokyo, Seoul, and other locations in FIG. 2. In the preferred embodiment, this dedicated holographic image capture studio incorporates cameras positioned on a multiple number of angles around a stage, where a target object is placed for video footage recording at the multiple number of angles around the stage. This specialized studio also typically connects the multi-angle cameras around the stage to a real-time or near real-time 3D reconstruction electronic system comprising 3D reconstruction computer graphics software, which is executed on a CPU and a memory unit of a high-performance computer server suited for intensive graphics processing. The real-time or near real-time 3D reconstruction electronic system in the HoloPortal (201) is configured to perform silhouette extractions, 3D voxel generation, 3D mesh generation, and texture and detail-adding operations to create a user-controllable three-dimensional model that resembles the target object.

The HoloWalks system also includes a HoloWalks Cloud module (203), which incorporates a user experience choreography engine and a 3D holographic database (205) and a walk-through map creation engine and 3D map database (207), as shown in the system block diagram (200) in FIG. 2. The user experience choreography engine in the HoloWalks Cloud module (203) allows an MR experience designer to select a holographic object from the 3D holographic database and place the holographic object in a particular location of a 3D map comprising one or more MR artificial layers and virtual coordinates superimposed on a physical space. Furthermore, the user experience choreography engine also allows the MR experience designer to create a series of prespecified or potential interactions, or "choreographies," between the holographic object and a HoloWalks viewer. The holographic object may be a holographic humanized tour guide, a holographic museum curator, a holographic mixed-reality object (MRO), a mixed-reality hologram (MRH), or another hologram that can be placed into a mixed-reality environment with one or more MR artificial layers and virtual coordinates superimposed on a physical space, which is typically a popular tourist spot, a museum exhibit, an event venue, or another tourist attraction.

Furthermore, the walk-through map creation engine and 3D map database (207) in the HoloWalks Cloud module (203) enables the MR experience designer to wear a head-mounted display (HMD) device and walk-through a targeted physical space (e.g. a particular location in a museum, a popular tourist spot, etc.), which activates the walk-through map creation engine in the HoloWalks Cloud module (203) to intelligently and automatically generate a 3D map from visual information gathered by the HMD. This intelligent machine-generated 3D map can be utilized as a mixed-reality artificial layer with virtual coordinates superimposed on the targeted physical space, and stored in the 3D map database in the HoloWalks Cloud module (203).

In the preferred embodiment, the HoloWalks Cloud module (203) is a 3D graphics-generating software element for the walk-through map creation engine and for the user experience choreography engine, as shown in the system block diagram (200) in FIG. 2. The HoloWalks Cloud module (203) also incorporates or connects to 3D map and 3D holographic relational databases as dynamic storages of 3D maps and holograms generated by the 3D graphics-generating software element. Typically, the HoloWalks Cloud module (203) is executed by a scalable number of CPUs, GPUs, and memory units in one or more high-performance cloud-networked computer servers suited for 3D graphics processing. The HoloWalks Cloud module (203) is also operatively connected to the HoloPortal component (201), the HoloWalks Creator module (209), authorized MR experience designer HMDs, smart phones, notebook computers, and personal computers, as shown in the system block diagram (200) in FIG. 2.

Furthermore, in the preferred embodiment of the invention, the MR experience designer wears a head-mounted display (HMD) device (213) or utilizes a portable electronic device connected to the HoloWalks Creator module (209) to create a 3D map on the fly at the vicinity of the targeted physical space or to select a stored 3D map from the 3D map database, and positions one or more holographic objects stored in the 3D holographic database at designer-desired specific virtual coordinates of a mixed-reality artificial layer relative to the targeted physical space by invoking a MR user experience construction interface. Preferably, the MR user experience construction interface provides intuitive gesture commands and user experience design choreography construction and controls on a partially-transparent menu visible in the HMD or in another portable electronic device, as illustrated in FIGS. 3A~3C and FIGS. 6C~6H.

In one embodiment of the invention, the digitized holographic model content stored in the 3D holographic database in the HoloWalks Cloud module (203) can be compressed and sub-divided as an object (OBJ) file and a digital asset exchange (DAE) file, wherein the OBJ file contains compressed multi-angle graphics data representing a particular holographic model, and wherein the DAE file contains digital graphics compatibility schemes and/or information, typically based on COLLADA (collaborative design activity) XML schema or another industry-standardized graphics compatibility scheme.

Then, the compressed holographic model content files (e.g. OBJ and DAE files) can be utilized by one or more holographic app and service toolkits, such as WebGL, Unity, and Unreal Engine, by HoloWalks content creators/mixed-reality experience designers to envision, generate, modify, and manage a variety of HoloWalks applications and service offerings. In context of the system block diagram (200) in FIG. 2, the holographic app and service toolkits may be integrated into or operatively connected to the user experience choreography engine and the walk-through map creation engine in the HoloWalks Cloud module (203) in the HoloWalks system. Alternatively, the holographic app and service toolkits may also be partially incorporated into the HoloPortal component (201) and/or the HoloWalks Creator module (209). The HoloWalks Creator module (209) utilizes the user experience choreography engine and the walk-through map creation engine in the HoloWalks Cloud module (203) to provide an MR user experience construction interface (e.g. FIGS. 3A~3C) to an MR experience designer, wherein the MR user experience construction interface is configured to create an intelligent machine-generated 3D map simply by user walk-through and to generate and choreograph MR guided tour contents with holographic objects superimposed on a targeted physical space containing physical objects, as demonstrated in FIGS. 3A~3C and FIGS. 6C~6H.

The system block diagram (200) for the HoloWalks system in FIG. 2 also incorporates a HoloWalks Viewer module (211), which comprises one or more software sub-modules executed in a CPU, a GPU, and/or a memory unit of a viewer's head-mounted display device (215, 217) or another portable electronic device (e.g. a smart phone, a table computer, etc.) capable of displaying mixed-reality environments via camera-enabled mobile applications. The HoloWalks Viewer module (211) incorporates a viewer's mixed-reality visualization interface executed and displayed by one or more portable electronic devices utilized by the mixed-reality experience viewer. Furthermore, as shown in FIG. 2, the HoloWalks Viewer module (211) is configured to download and playback a plurality of "HoloWalks Events" choreographed and implemented by one or more MR experience designers that utilized one or more HoloWalks Creator modules (209) to generate and insert 3D maps, holographic object positioning, holographic object and physical object interactions and choreographies, and informative historic, cultural, and/or tourism-related details in the plurality of HoloWalks Events. In context of various embodiments of the present invention, HoloWalks Events are immersive mixed-reality scenarios that are executed and displayed in the viewer's head-mounted display device (215, 217) or another portable electronic device operatively connected to the HoloWalks Viewer module (211) and/or the rest of the components (i.e. 209, 203, 201) in the HoloWalks system.

Furthermore, in one embodiment of the invention, the HoloWalks system may also incorporate a holographic mixed-reality browser and a third-party holographic application loader that are configured to load and display various holographic third-party HoloWalks apps by connecting to and downloading various software applications from a cloud-connected computer server, which executes a third-party holographic application database and a tourist or museum curation-related hologram software development kit (e.g. HoloWalks SDK) for implementation and deployment of various tourist or visitor-assisting holographic applications that can be utilized in HoloWalks mixed-reality experience environments. In one instance, "third-party" refers to an independent group of HoloWalks app developers who are not operated or owned by HoloWalks system operators, tourism organizations, or museum owners. In another instance, "third-party" may include tourism counsel-partnered or museum owner-affiliated independent app developers.

Figure 3A:
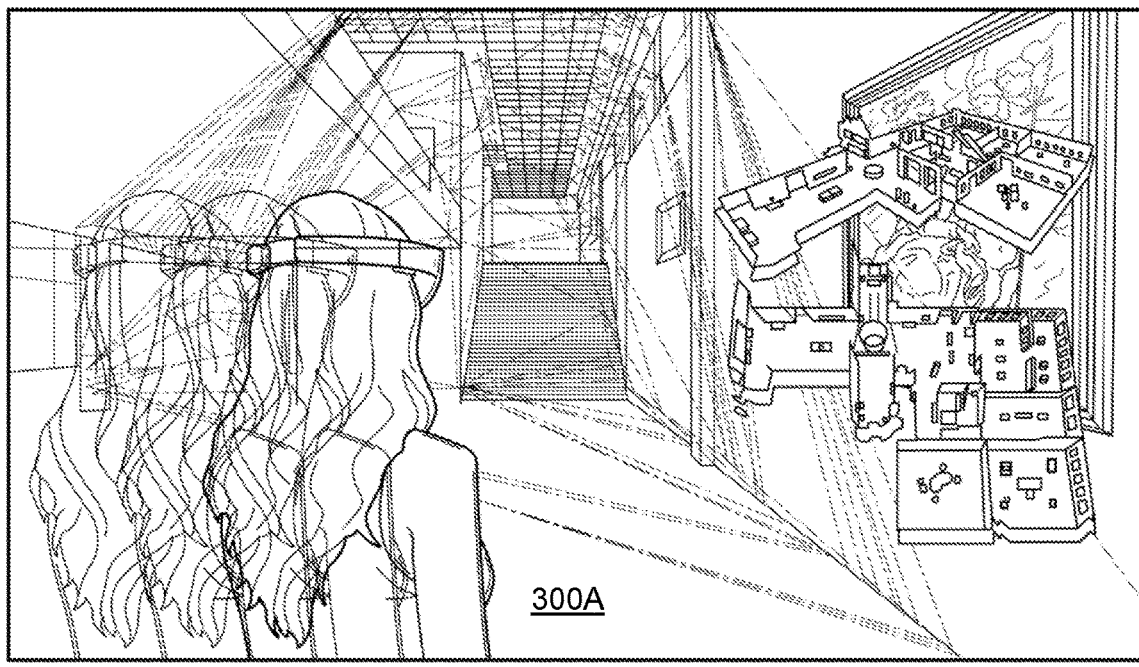
FIG. 3A shows a HoloWalks experience designer walking through a physical space, which enables the HoloWalks system to automatically and intelligently create three-dimensional (3D) digitized mapping visualization data for synthesizing a mixed-reality artificial layer construction, in accordance with an embodiment of the invention.

FIG. 3A shows a HoloWalks experience designer walking through a physical space (300A), which enables the HoloWalks system to automatically and intelligently create three-dimensional (3D) digitized mapping visualization data for synthesizing a mixed-reality artificial layer construction, in accordance with an embodiment of the invention. In a preferred embodiment of the invention, the HoloWalks experience designer is type of a mixed-reality (MR) experience designer who wears a head-mounted display (HMD) device and walks through the physical space (300A). A HoloWalks Creator module (e.g. 209 in FIG. 2) connected to a walk-through map creation engine with a 3D map database (e.g. 207 in FIG. 2) and a user experience choreography engine with a 3D holographic database (e.g. 205 in FIG. 2) provides the intelligent machine-generated 3D mapping via the MR experience designer walk-through, as visual sensors incorporated in the HMD device scan the vicinity of the physical space (300A) and transmit raw imaging data to the HoloWalks Creator module and the walk-through map creation engine. Once the walk-through map creation engine completes an automated 3D map construction, the newly-created 3D map can be stored and categorized in the 3D map database for convenient on-demand retrieval for subsequent mixed-reality user experience design creations for the physical space (300A).

Figure 3B:
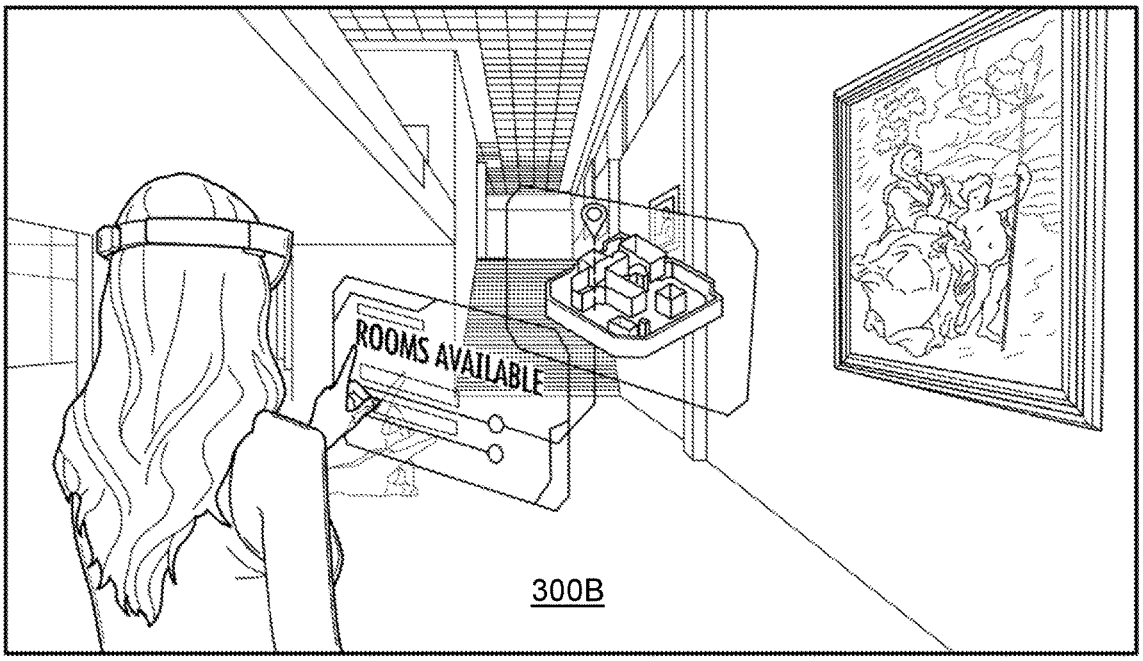
FIG. 3B shows a HoloWalks experience designer selecting a desired spot within the three-dimensional (3D) map in a mixed-reality visual interface to initiate a mixed-reality holographic guide content creation, in accordance with an embodiment of the invention.
Figure 3C:
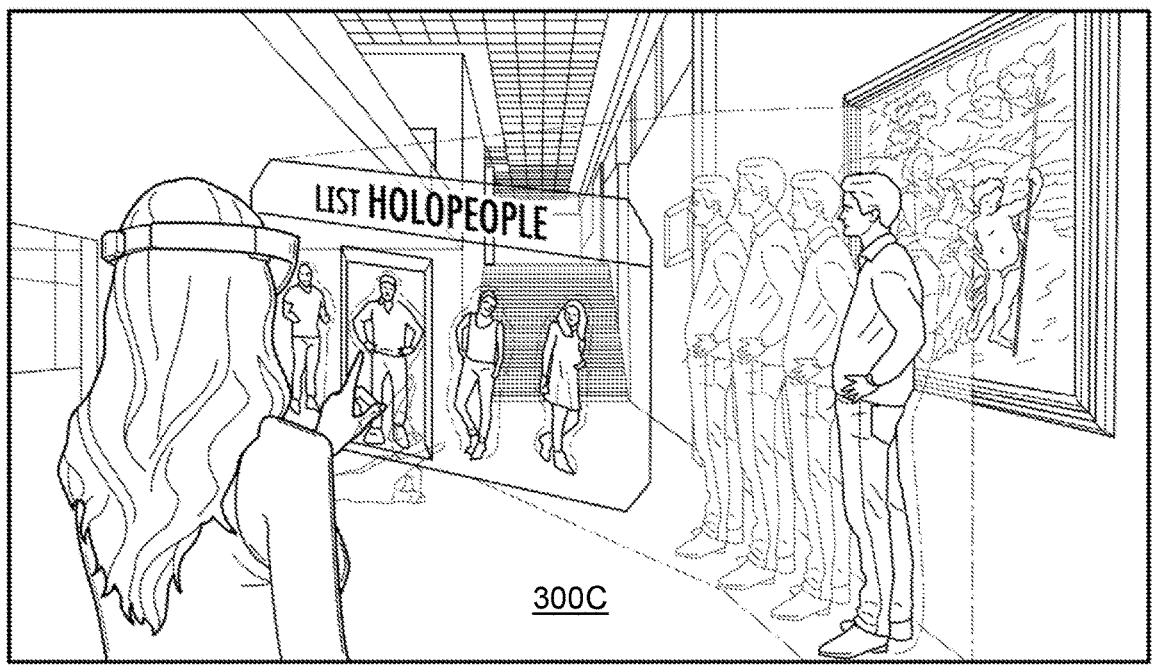
FIG. 3C shows a HoloWalks experience designer placing holographic contents and overlaying user interaction elements within the 3D map in the mixed-reality visual interface in the HoloWalks system, in accordance with an embodiment of the invention.

FIG. 3B shows the MR experience designer selecting a desired spot within the three-dimensional (3D) map in a mixed-reality (MR) experience construction interface (300B) to initiate a mixed-reality holographic guide content creation, in accordance with an embodiment of the invention. Furthermore, the MR experience designer subsequently places holographic contents and overlays user interaction elements (300C) in the desired spot within the 3D map by utilizing the mixed-reality (MR) experience construction interface in the HoloWalks system, as shown in FIG. 3C. In this particular example, the MR experience construction designer is placing a holographic museum curator in front of an exhibited painting and choreographing the holographic museum curator's movements, actions, and/or narrations, so that the future visitors to the museum can experience the holographic museum curator's interactivities in front of the exhibited painting, if the visitors are immersed in a related mixed-reality environment provided by an HMD device or another portable electronic device enabling the mixed-reality environment.

Figure 3D:
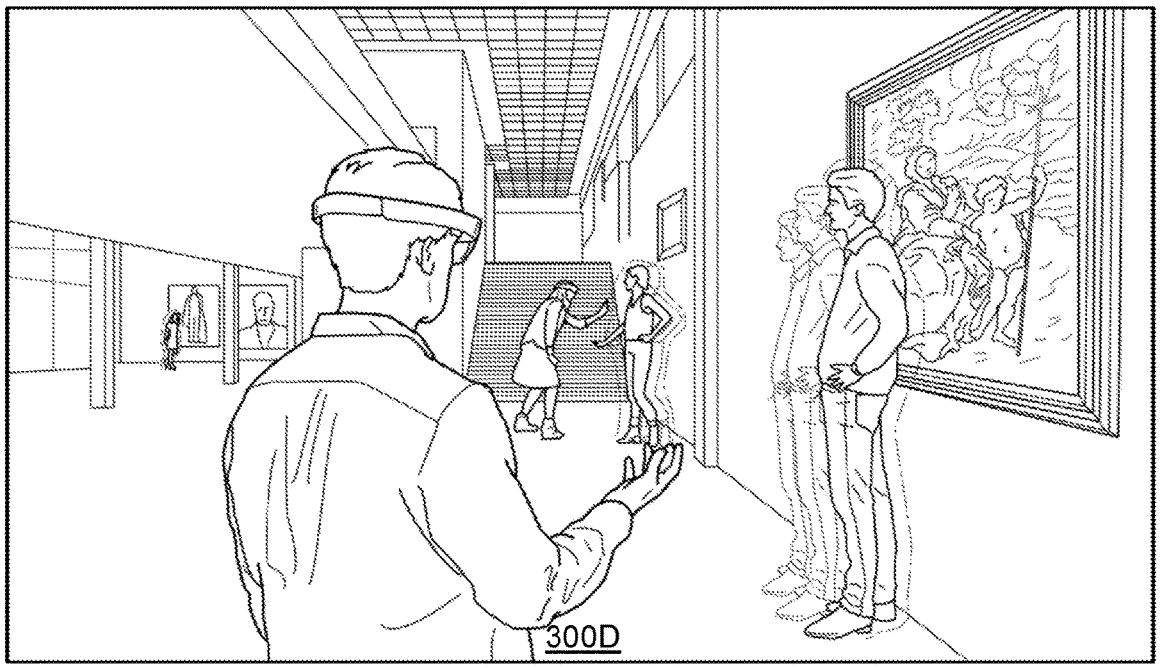
FIG. 3D shows a user interacting with a holographic guide and/or contents in a mixed-reality environment provided by a HoloWalks viewer, in accordance with an embodiment of the invention.

In some embodiments of the invention, the holographic objects, such as the holographic museum curator as shown in FIGS. 3C and 3D, may integrate artificial intelligence to answer questions and/or converse dynamically and informatively, if the visitors or tourists ask questions to the holographic objects while utilizing their HMD devices or other mixed-reality environment-enabling portable electronic devices. Furthermore, the holographic objects and/or contents placed in the desired spot and the overlayered user interaction elements can be time-sequenced and choreographed relative to potential user interactions with the holographic and/or physical objects, which can be experienced in the desired spot through an immersive mixed-reality graphics environment provided by HMD devices or other portable electronic devices utilized by tourists or museum visitors, when the fully-constructed MR experience event is activated in the desired spot.

In the usage example sequence as illustrated in FIGS. 3B and 3C, the HoloWalks Creator module (e.g. 209 in FIG. 2) in the 3D mixed-reality space and experience construction sharing system (i.e. the HoloWalks system) utilizes the user experience choreography engine and the walk-through map creation engine in the HoloWalks Cloud module (e.g. 203 in FIG. 2) to provide the MR experience construction interface to the MR experience designer to enable intelligent machine-generated 3D map via user walk-through and choreographed MR guided tour content creation. Moreover, the MR experience designer can wear a head-mounted display (HMD) device or utilize a portable electronic device connected to the HoloWalks Creator module to create a 3D map on the fly at the vicinity of the targeted physical space or to select a stored 3D map from the 3D map database, and position one or more holographic objects stored in the 3D holographic database at designer-desired specific virtual coordinates of a mixed-reality artificial layer relative to the targeted physical space by invoking a MR user experience construction interface. Preferably, the MR user experience construction interface provides intuitive gesture commands and user experience design choreography construction and controls on a partially-transparent menu visible in the HMD or in another portable electronic device, as demonstrated in FIGS. 3A~3C.

FIG. 3D shows a user (300D) interacting with a holographic guide and/or contents in a mixed-reality environment provided by a HoloWalks viewer, in accordance with an embodiment of the invention. In the preferred embodiment of the invention, the user (300D) is a tourist or a visitor to a museum exhibit, who is immersed in a mixed-reality environment provided by an HMD device or another portable electronic device to experience the holographic museum curator's interactivities in front of the exhibited painting, as shown in FIG. 3D. The user (300D) can listen to verbal narration and observe animated movements from the holographic museum curator, while observing real physical paintings in the museum exhibit in the mixed-reality environment. In some cases, the user (300D) can also ask questions and converse interactively with the holographic museum curator, which incorporates an advanced level of artificial intelligence to retrieve historical, cultural, and artistic background information from a fine arts database and to synthesize naturalized speeches for coherent and dynamic conversations with the user (300D).

Figure 4:
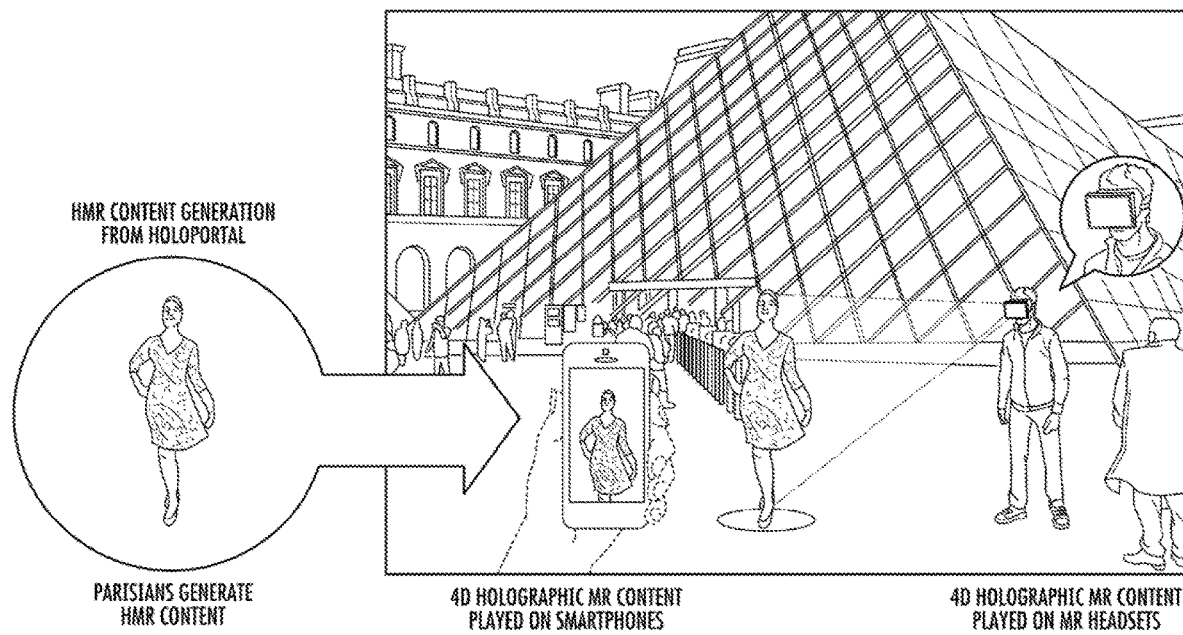
FIG. 4 shows a Parisian holographic mixed-reality (HMR) tour guide application utilizing the three-dimensional (3D) mixed-reality space and experience construction sharing system (i.e. the "HoloWalks" system), in accordance with an embodiment of the invention.

FIG. 4 shows a Parisian holographic mixed-reality (HMR) tour guide application (400) utilizing the three-dimensional (3D) mixed-reality space and experience construction sharing system (i.e. the "HoloWalks" system), in accordance with an embodiment of the invention. As shown in this example, the Parisian HMR tour guide application (400) involves one or more Paris residents generating HMR tour guide contents by utilizing a HoloWalks Creator module in the HoloWalks system, and uploading such HMR tour guide contents to a HoloWalks Cloud module, which can be accessed by a tourist to Paris via a HoloWalks Viewer module.

In a preferred embodiment of the invention, the tourist may wear a head-mounted display (HMD) device or utilize another portable electronic device with a display unit (e.g. a smart phone, a tablet computer, etc.) to engage in an immersive 3D mixed-reality environment, when the tourist-selected HMR tour guide content is uploaded to the HMD device or the portable electronic device executing a 3D mixed-reality mobile app. In a typical system configuration, the HoloWalks Viewer module provides an electronic user interface that allows each tourist to select a desired HoloWalks Event (i.e. a HoloWalks mixed-reality application) to execute in the tourist's HMD device or another portable device carried by the tourist, as shown in FIG. 4.

Figure 5:
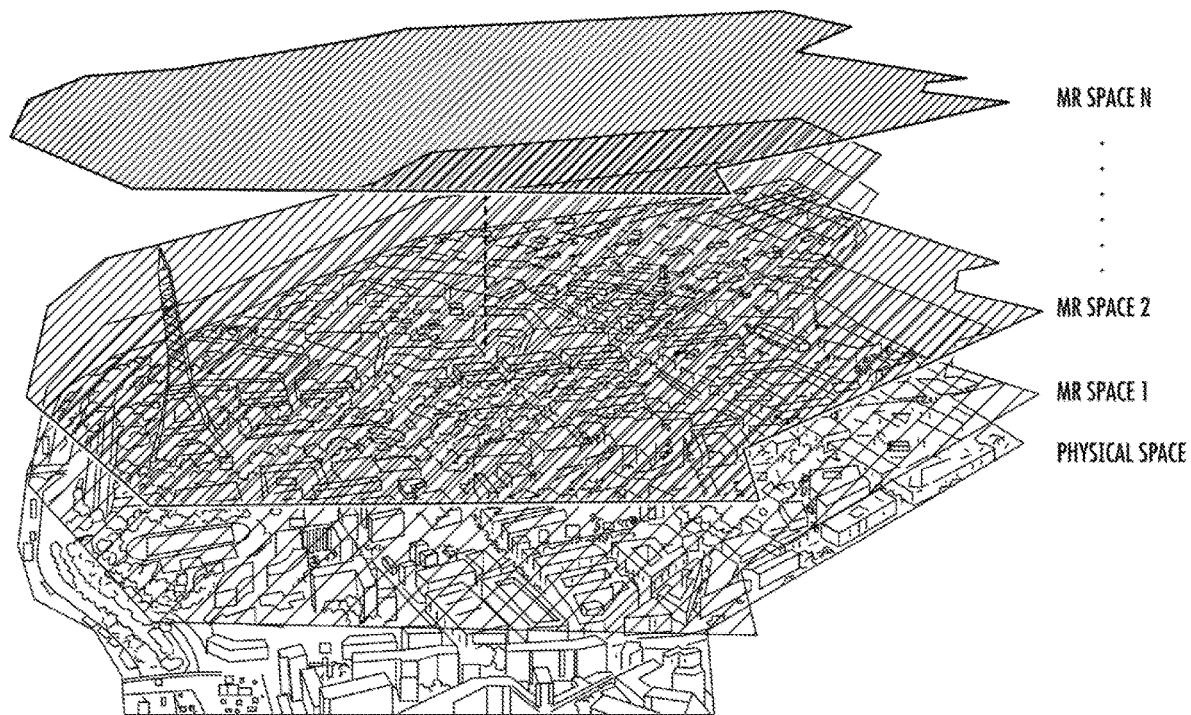
FIG. 5 shows an example of multiple mixed-reality (MR) artificial layers superimposed on a physical space for construction of a mixed-reality (MR) application from the three-dimensional (3D) mixed-reality space and experience construction sharing system (i.e. the "HoloWalks" system), in accordance with an embodiment of the invention.

FIG. 5 shows an example (500) of multiple mixed-reality (MR) artificial layers superimposed on a physical space for construction of a mixed-reality (MR) application from the three-dimensional (3D) mixed-reality space and experience construction sharing system (i.e. the "HoloWalks" system), in accordance with an embodiment of the invention. Each MR artificial layer is a computer-generated graphics layer in which mixed-reality objects (MROs) and mixed-reality holographic (MRH) human guides or curators are created and positioned by the HoloWalks system onto the MR artificial layer's virtual coordinates that correlate to the physical space of a potential viewer's interest, such as a tourist destination, a museum, or an exhibition venue.

As shown by the example (500) in FIG. 5, several MR artificial layers (i.e. MR Space 1, MR Space 2, . . . , MR Space N) may be superimposed on top of the physical space for sophisticated MRO and MRH placements and intricate choreographic interaction experience deisgns with the potential viewer. In a preferred embodiment of the invention, the viewer immersed in the mixed-reality environment is typically required to be present at the particular physical space correlated and synchronized with the computer-generated lifelike holographic objects and the real physical objects in one or more mixed-reality artificial layers superimposed on the particular physical space. Furthermore, the viewer is also required to wear a head-mounted display (HMD) device or at least utilize a mobile electronic device configured to execute a mixed-reality mobile application, in order to experience the mixed-reality environment generated by the HoloWalks system.

Figure 6A:
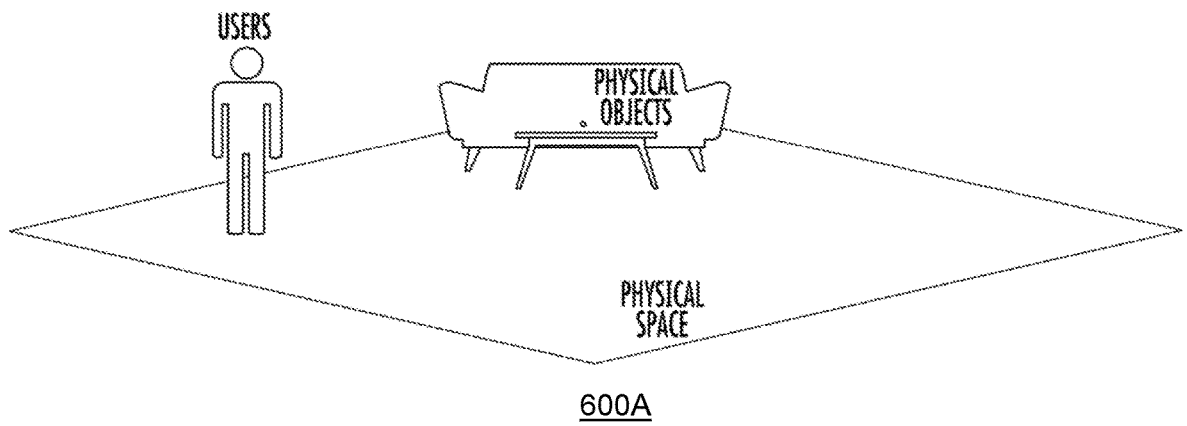
FIG. 6A shows a first step in a mixed-reality (MR) application example, in which a user perceives physical objects in a physical space, in accordance with an embodiment of the invention.

FIG. 6A shows a first step (600A) in a mixed-reality (MR) application example, in which a user (e.g. a tourist or a visitor) perceives physical objects in a physical space, in accordance with an embodiment of the invention. Because the user does not wear a HMD device or utilizes another portable electronic device to invoke and visualize an MR environment, the user only perceives physical objects present in the physical space.

Figure 6B:
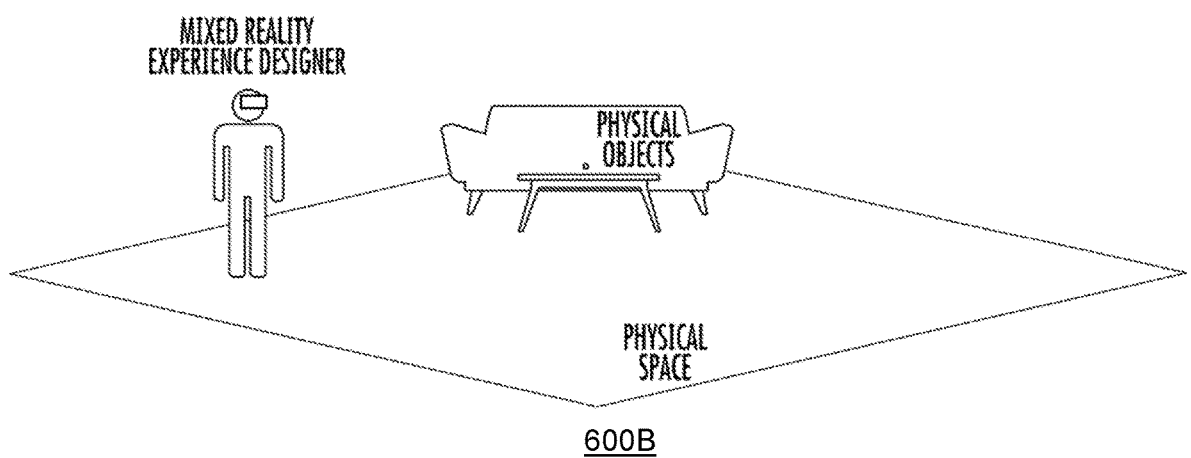
FIG. 6B shows a second step in the mixed-reality (MR) application example, in which a mixed-reality (MR) experience designer wears a head-mounted display (HMD) in the same physical space to initiate an MR content creation, in accordance with an embodiment of the invention.

FIG. 6B shows a second step (600B) in the mixed-reality (MR) application example, in which a mixed-reality (MR) experience designer wears a head-mounted display (HMD) in the same physical space to initiate an MR content creation via an MR experience construction interface, in accordance with an embodiment of the invention. In another embodiment of the invention, the MR experience designer may instead utilize a smart phone or a table computer to activate the MR experience construction interface.

Figure 6C:
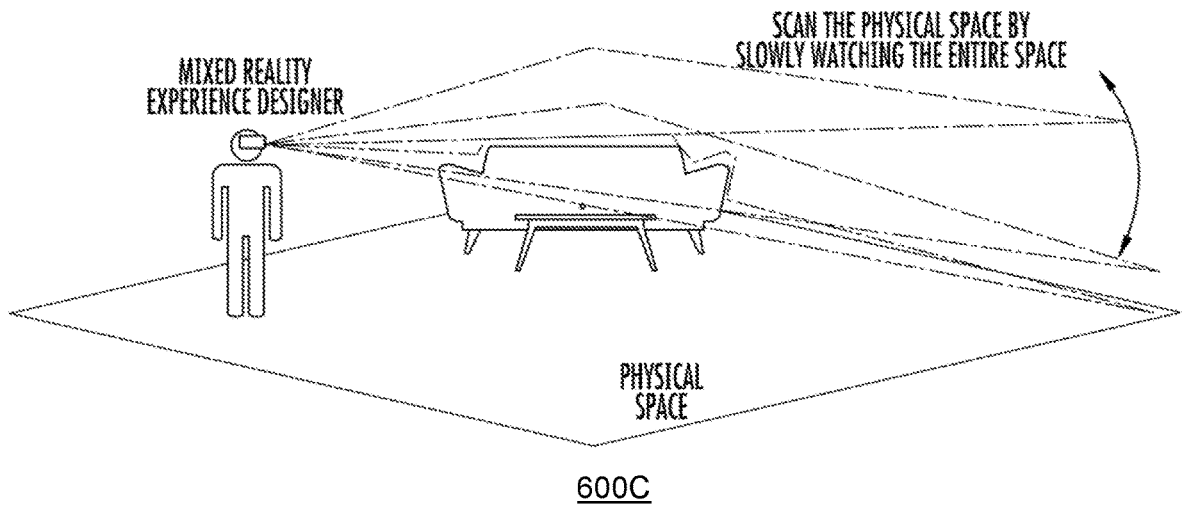
FIG. 6C shows a third step in the mixed-reality (MR) application example, in which the HoloWalks system enables automated intelligent three-dimensional (3D) mapping of the physical space via HMD space scanning by the MR experience designer, in accordance with an embodiment of the invention.

FIG. 6C shows a third step (600C) in the mixed-reality (MR) application example, in which the HoloWalks system enables automated intelligent three-dimensional (3D) mapping of the physical space via HMD space scanning by the MR experience designer, in accordance with an embodiment of the invention. As shown in the third step (600C), the MR experience designer systematically glances at the entire physical space while wearing the HMD device, which enables the walk-through map creation engine in the HoloWalks system to autonomously and intelligently construct a machine-generated 3D map of the physical space, as previously described in conjunction with FIGS. 1, 2, and 3A.

Figure 6D:
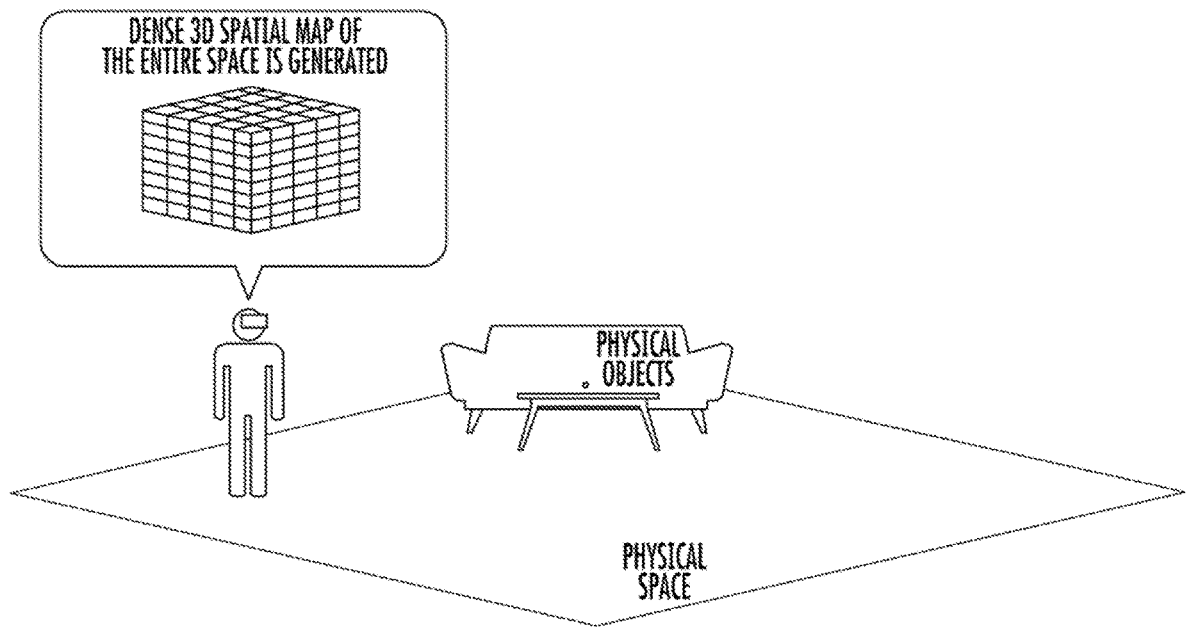
FIG. 6D shows a fourth step in the mixed-reality (MR) application example, in which the HoloWalks system completes user glare-invoked intelligent 3D mapping of the physical space, in accordance with an embodiment of the invention.

FIG. 6D shows a fourth step (600D) in the mixed-reality (MR) application example, in which the HoloWalks system completes user glare-invoked intelligent 3D mapping of the physical space, in accordance with an embodiment of the invention. The machine-generated 3D map of the physical space is then stored and categorized for dynamic on-demand retrieval in the 3D map database, which is incorporated in the HoloWalks Cloud module, as previously described in conjunction with FIG. 2.

Figure 6E:
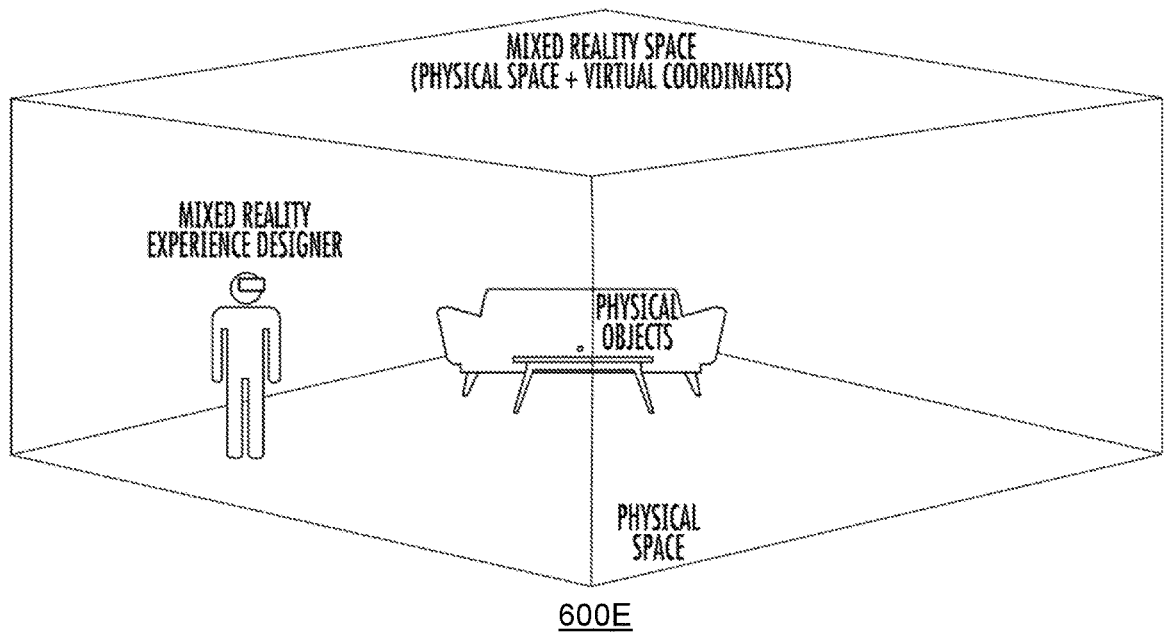
FIG. 6E shows a fifth step in the mixed-reality (MR) application example, in which the HoloWalks system creates virtual coordinates on mixed-reality artificial layer(s) in preparation of the MR experience designer's MR content synthesis, in accordance with an embodiment of the invention.

FIG. 6E shows a fifth step (600E) in the mixed-reality (MR) application example, in which the HoloWalks system creates virtual coordinates on mixed-reality (MR) artificial layer(s) in preparation of the MR experience designer's MR content synthesis, in accordance with an embodiment of the invention. As previously shown and described in conjunction with FIG. 5, a multiple number of MR artificial layers can be superimposed on the physical space, wherein each MR artificial layer contains its own set of virtual coordinates where the MR experience designer can place mixed-reality objects (MROs) and/or mixed-reality holograms (MRHs) and implement choreographic user interactivity elements, artificial intelligence for dynamic conversation capabilities associated with MROs or MRHs, and descriptive information that can be presented by the MROs or MRHs.

Figure 6F:
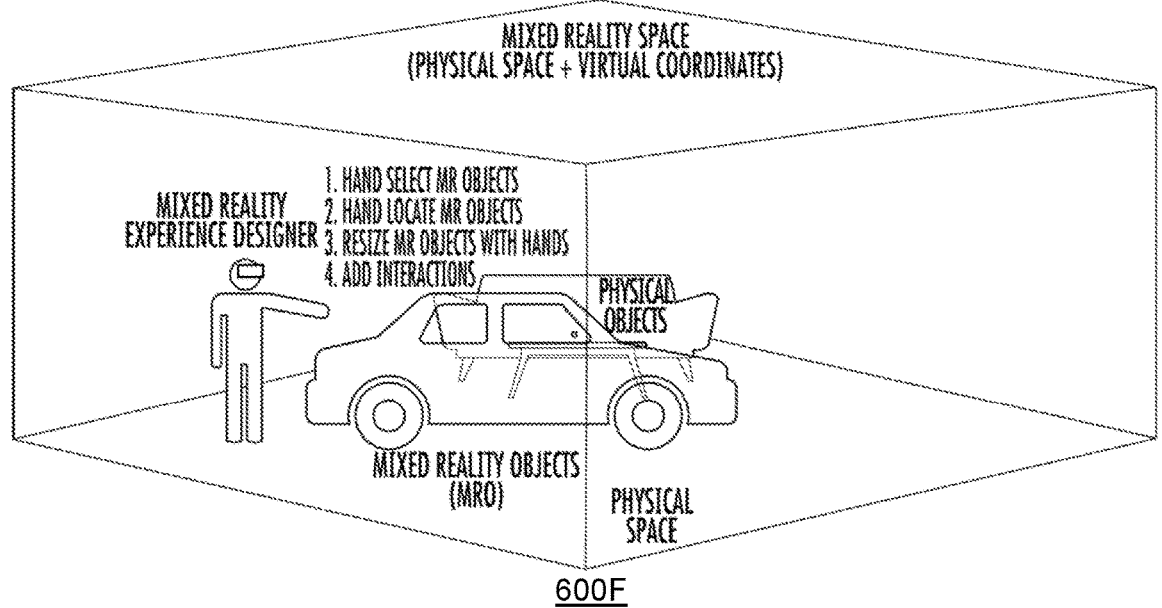
FIG. 6F shows a sixth step in the mixed-reality (MR) application example, in which the MR experience designer selects and directs mixed-reality objects (MROs) and interactions in the MR artificial layer(s) intertwined with physical objects and physical space, in accordance with an embodiment of the invention.

FIG. 6F shows a sixth step (600F) in the mixed-reality (MR) application example, in which the MR experience designer selects and directs mixed-reality objects (MROs) and interactions in the MR artificial layer(s) intertwined with physical objects and physical space, in accordance with an embodiment of the invention. As shown in the sixth step (600F), the MR experience designer can utilize gesture commands, voice commands, or other action-invoking commands to select, locate, resize, and modify MROs and their choreographic user interactivity elements, using the MR experience construction interface displayed on the HMD or another portable electronic device.

Figure 6G:
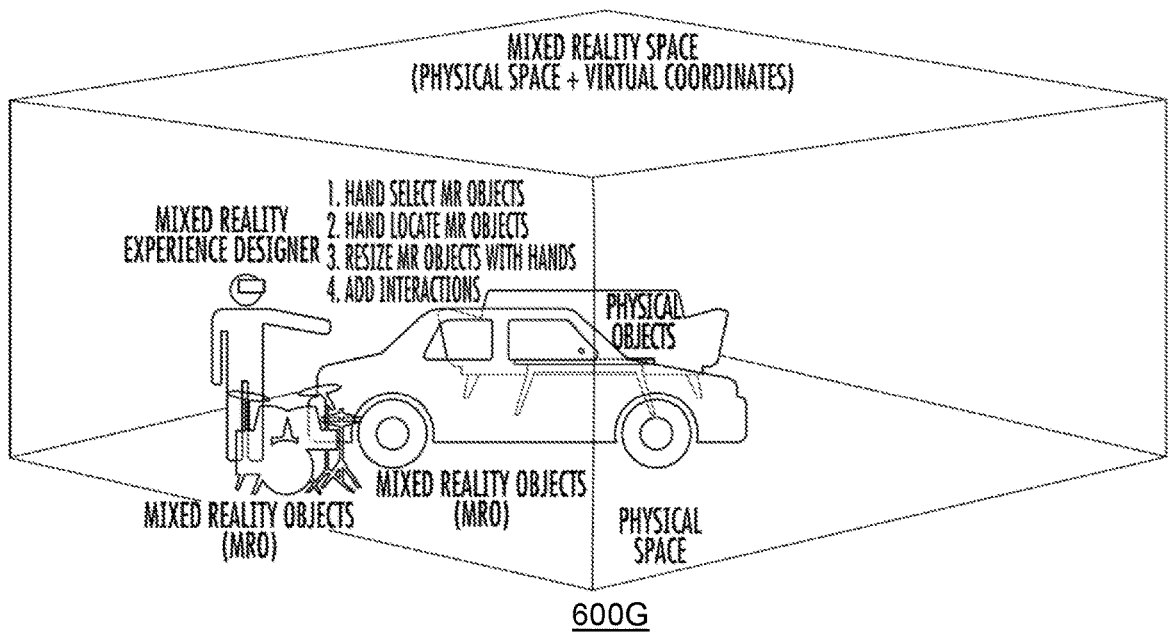
FIG. 6G shows a seventh step in the mixed-reality (MR) application example, in which the MR experience designer places and directs more MROs and interactions in the MR artificial layer(s) intertwined with physical objects and physical space, in accordance with an embodiment of the invention.
Figure 6H:
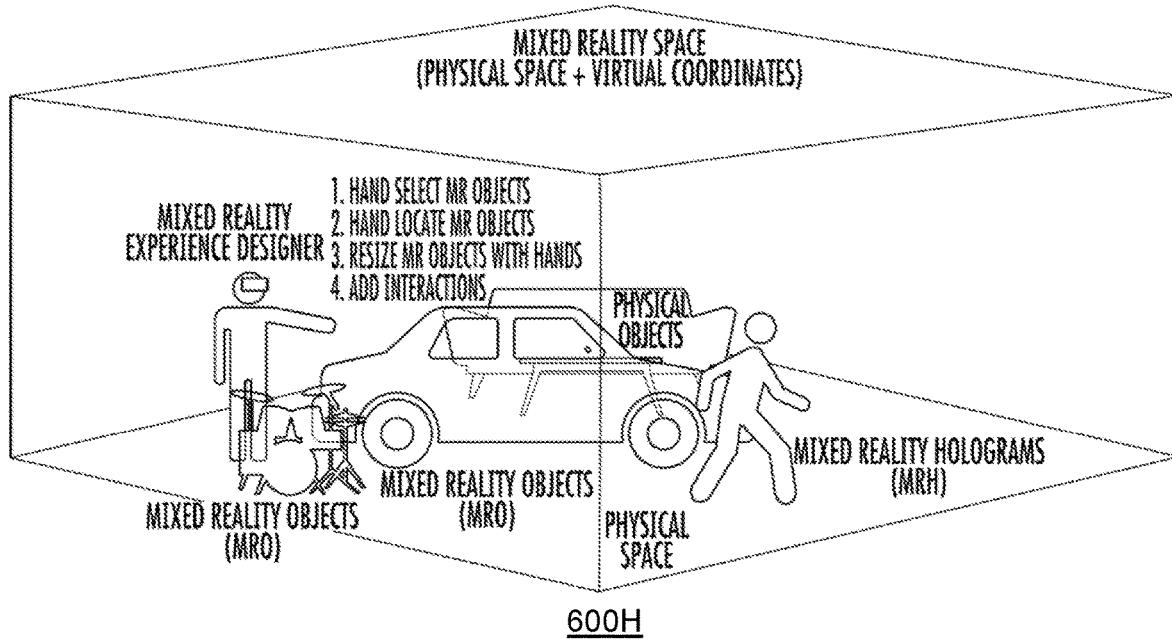
FIG. 6H shows an eighth step in the mixed-reality (MR) application example, in which the MR experience designer places more MROs, mixed-reality holograms (MRHs), and interactions in the MR artificial layer(s) intertwined with physical objects and physical space, in accordance with an embodiment of the invention.

Furthermore, FIG. 6G shows a seventh step (600G) in the mixed-reality (MR) application example, in which the MR experience designer places and directs more MROs and interactions in the MR artificial layer(s) intertwined with physical objects and physical space, in accordance with an embodiment of the invention. Likewise, FIG. 6H shows an eighth step (600H) in the mixed-reality (MR) application example, in which the MR experience designer places more MROs, mixed-reality holograms (MRHs), and interactions in the MR artificial layer(s) intertwined with physical objects and physical space, in accordance with an embodiment of the invention.

In the preferred embodiment of the invention, the MR experience construction interface is downloaded or transmitted from the HoloWalks Creator module to the HMD or another portable electronic device utilized by the MR experience designer. In another embodiment of the invention, the MR experience construction interface can be locally preloaded to the HMD or another portable electronic device, and is executable on CPUs, GPUs, and/or memory units in such devices, even if they are not currently connected to the rest of the HoloWalks system at the time of MR experience construction at the physical space.

Once the MR experience construction is completed, the 3D map data and the MR user experience choreography data, which are key components of the MR experience construction for the physical space, are categorized and stored in the 3D map database and the 3D holographic database. In some embodiments of the invention, a dedicated "MR user experience" database may store the 3D map data and the MR user experience choreography data separately for each MR user experience scenario created within the HoloWalks system.

Figure 6I:
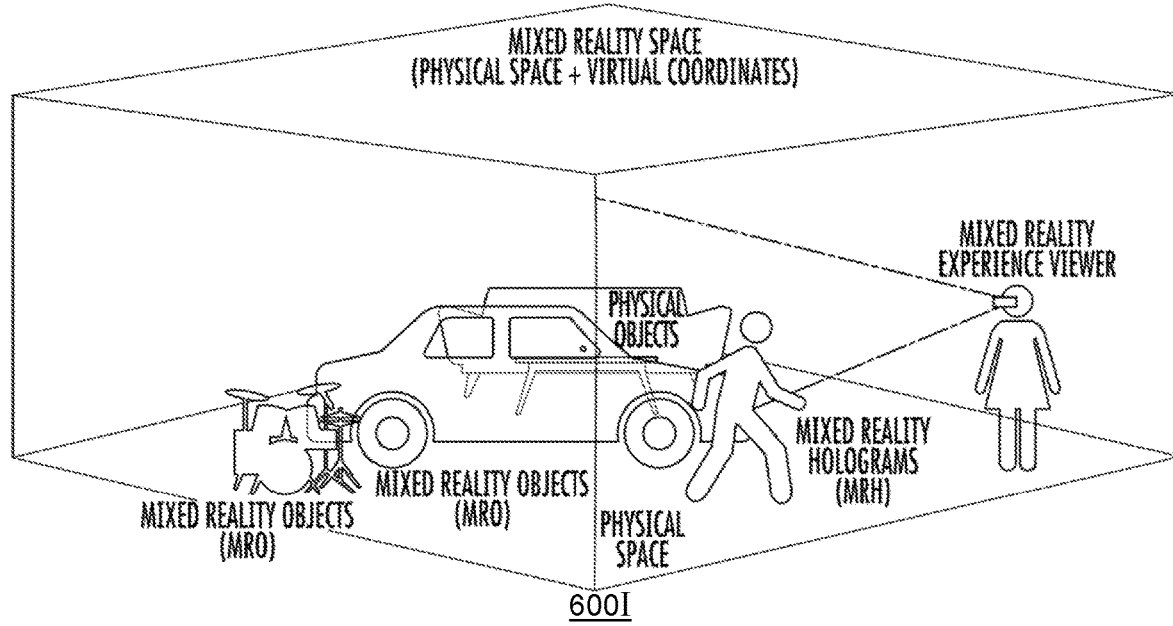
FIG. 6I shows a ninth step in the mixed-reality (MR) application example, in which an MR experience viewer equipped with HMD engages in lifelike intertwined visualization of MROs, MRHs, and physical objects in the same physical space, in accordance with an embodiment of the invention.

FIG. 6I shows a ninth step (600I) in the mixed-reality (MR) application example, in which an MR experience viewer equipped with a viewer's HMD engages in lifelike intertwined visualization of MROs, MRHs, and physical objects in the same physical space, when the MR user experience scenario is executed on the viewer's HMD, if the MR experience viewer is present at the physical space. The MR experience viewer may utilize a smart phone, a tablet computer, or another portable electronic device with a display unit, instead of the HMD, to experience the MR user experience scenario, if such portable electronic devices are capable of executing mixed-reality viewer mobile applications for the HoloWalks system.

Figure 6J:
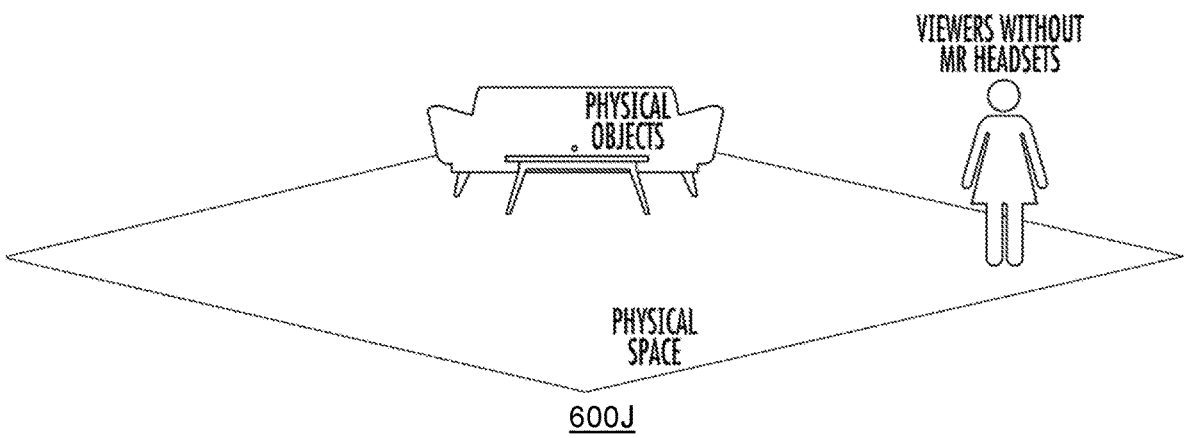
FIG. 6J shows a tenth step in the mixed-reality (MR) application example, in which the MR experience viewer, while not wearing the HMD, only sees physical objects without visual recognition of the MROs and the MRHs implemented in the same physical space in the MR artificial layer(s), in accordance with an embodiment of the invention.

FIG. 6J shows a tenth step (600J) in the mixed-reality (MR) application example, in which the MR experience viewer, while not wearing the HMD, only sees physical objects without visual recognition of the MROs and the MRHs implemented in the same physical space in the MR artificial layer(s), in accordance with an embodiment of the invention. The MR experience viewer may be a tourist or a visitor to a popular tourist attraction or an exhibition venue. In some embodiments of the inventio, the MR experience viewer may decide to intermittently experience the mixed-reality environment for rich holographic interactivity and media information on a case-by-case basis, while enjoying observation of pure physical objects only in other instances, during his or her visit to the physical space.

In one embodiment of the invention, a rapid three-dimensional holographic model generation from a dedicated real-time model reconstruction studio with multiple camera angles may be utilized as a component of a 3D mixed-reality space and experience construction and sharing system, which is interchangeably called herein as the "HoloWalks" system.

In a preferred embodiment of the invention, the dedicated real-time model reconstruction studio with multiple camera angles is called "HoloPortal." HoloPortal is a 3D model creation studio with a real-time or near real-time 3D reconstruction system. This 3D model creation studio is configured to place a target object (e.g. a human, an animal, or another moving object) in a designated area of the 3D model creation studio that positions a plurality of cameras in various angles around the designated area to capture multi-angle video footages of the target object. Then, the multi-angle video footages are processed, transformed, and reconstructed as dynamic 3D models, which may include 3D mesh models, textures for all related frames, and movement frames associated with the target object. After the dynamic 3D models, also called herein as "3D body doubles" are generated from the HoloPortal, the dynamic 3D models can be stored in a HoloWalks 3D holographic database. Then, the 3D mixed-reality space and experience construction and sharing system synthesizes a 3D mixed-reality artificial layer, where one or more dynamic 3D models are selected and placed into specific virtual coordinates next to locations of physical objects as mixed-reality objects (MROs) or mixed-reality holograms (MRHs), in accordance with a mixed-reality designer's intended user interaction choreographies, as illustrated, for example, in FIG. 3C and FIG. 6F~FIG. 6H. The HoloPortal in the HoloWalks system may be dynamically linked to an electronic social platform for sharing, monetizing, and viewing a variety of dynamic 3D models stored in the 3D model database. These dynamic 3D models may be generated in 3D model formats such as OBJ's and/or COLLADA's.

In one example, HoloPortal first records multi-angle videos from a multiple number of cameras surrounding the designated area. Then, the multi-angle videos undergo silhouette extractions, 3D voxel generation, 3D mesh generation, deformed 3D mesh generation, and texture-on-mesh generation to create a 3D model, or a "3D body double" model through a variety of data transformations and graphics reconstructions executed on graphics processing units incorporated in or associated with the HoloPortal. Preferably, the HoloPortal can generate 3D models (e.g. "3D body doubles") and 3D contents in real-time or near real-time, without lengthy and laborious conventional methods of 3D content generation processes that can take many hours to many months. Furthermore, the 3D models generated from the HoloPortal can be utilized in as characters in a mixed-reality application, an augmented reality application, a virtual reality application, a 3D computerized game, or a 3D animation movie. For example, a holographic 3D model (e.g. a "three-dimensional (3D) body double" model created after the multi-angle video capture of a human figure) may be created and inserted into a mixed-reality artificial layer correlated to a particular physical space (e.g. a tourist destination, etc.) in virtual coordinates as a tour guide, a museum curator, or an exhibit venue assistant in a HoloWalks application. Moreover, in some embodiments of the invention, a computerized 3D model created from the HoloPortal may also be physically manufactured with a 3D printing machine located within or outside the HoloPortal for commercial, promotional, business, or transactional purposes.

Furthermore, in some embodiments of the invention, the 3D mixed-reality space and experience construction sharing system may utilize another component called "HoloCloud" for creation of a three-dimensional holographic model, instead of or in combination with the HoloPortal. The HoloCloud system provides a rapid three-dimensional model generation process from uncalibrated multiple sources of video recording of a targeted object and subsequent cloud computing-based video data calibration and three-dimensional reconstruction of the targeted object. Typically, the HoloCloud system comprises a plurality of common consumer-level video recording devices (e.g. smartphones, camcorders, digital cameras, etc.) positioned in various angles surrounding a target object (e.g. a human, an animal, a moving object, etc.), a scalable number of graphic processing units (GPU's) in a scalable cloud computing platform, a 3D pre-processing module, a 3D reconstruction module, a background 3D graphics content, a 360-degree virtual reality or video content, and a dynamic 3D model created by the 3D reconstruction module.

The plurality of common consumer-level video recording devices generate a plurality of digitized video feeds (e.g. Video 1, Video 2, . . . Video n) in various angles for a target object, and then utilizes an integrated or standalone wireless transceiver (e.g. a cellular transceiver, a WiFi LAN transceiver, etc.) to transmit the plurality of digitized video feeds to a HoloCloud graphics processing unit (GPU) in a cloud computing platform. In a preferred embodiment, the HoloCloud GPU incorporates a pre-processing module and a 3D reconstruction module. The pre-processing module is configured to calibrate temporal, spatial, and photometrical variables of the multi-angle digitized video feeds, and is also able to generate background 3D geometry and 360-degree virtual reality video. The 3D reconstruction module is configured to provide depth map computations, voxel grid reconstructions, and deformed mesh generations for eventual generation of dynamic 3D models. After numerous internal stages of video extractions, transformations, and reconstruction through the HoloCloud GPU, the background 3D graphics content, the 360-degree virtual reality or video content, and the dynamic 3D models are electronically generated and subsequently utilized as 3D figures, graphics, or holograms in HoloWalks applications or other mixed-reality applications.

Pre-processing and reconstruction procedures for the HoloCloud system require cloud computing-based video data calibration and three-dimensional reconstructions of a targeted object, in accordance with an embodiment of the invention. A multiple number of common consumer-level video recording devices generates a plurality of digitized video feeds (e.g. Video 1, Video 2, . . . Video n) in various angles for a target object, and then transmit the plurality of digitized video feeds to a HoloCloud graphics processing unit (GPU) in a cloud computing platform. Typically, the cloud computing platform is a collective number of graphics computing machines that are dynamically scalable to deploy and assign a flexible number of GPU's for parallel processing, depending on the intensity of graphics computation, transformation, and reconstruction requirements for the plurality of digitized video feeds. For example, a larger number of GPU's may be assigned to perform 3D graphics processing if the plurality of digitized video feeds has a high video feed count, long durations, and/or higher resolutions. In contrast, a smaller number of GPU's may be assigned to perform 3D graphics processing if the plurality of digitized video feeds has a low video feed count, short durations, and/or lower resolutions.

In cloud computing-based video data calibration and three-dimensional reconstructions of the targeted object, each HoloCloud GPU can incorporate a pre-processing module and a 3D reconstruction module. The pre-processing module executes calibration of temporal, spatial, and photometrical variables of the multi-angle digitized video feeds, and is also able to generate background 3D geometry and 360-degree virtual reality video. The 3D reconstruction module, on the other hand, performs depth map computations, voxel grid reconstructions, and deformed mesh generations for eventual generation of dynamic 3D models or characters.

After numerous internal stages of video extractions, transformations, and reconstruction through one or more HoloCloud GPU's that are typically configured to scale and parallel-process a varying amount of workload for 3D content generation, the background 3D geometry graphics content, the 360-degree virtual reality video content, and the dynamic 3D model are electronically generated and subsequently utilized as 3D figures or graphics in a HoloWalks application or another mixed-reality application. The HoloCloud system, which utilizes a plurality of common consumer-level video recording devices for multi-angle video feeds of a target object and a scalable number of HoloCloud GPU's for video extractions, transformations, and reconstruction of dynamic 3D models, enables casual (i.e. non-technical or not technically skillful) consumers to be professional-level 3D content creators or mixed-reality experience designers, who are able to capture and generate 3D graphics contents rapidly and inexpensively without necessitating specialized 3D content recording equipment and/or high-powered 3D graphics computing equipment on site that are typically required in conventional 3D content generation.

Furthermore, by wirelessly transmitting the recorded multi-angle video feeds to a scalable number of HoloCloud GPU's executed in a cloud computing network that processes high-powered graphics computing tasks to generate dynamic 3D models, a casual content creator is not required to have an expert knowledge of 3D graphics pre-processing and reconstruction processes that may be electronically executed by a third-party HoloCloud service operator. Therefore, various embodiments of the present invention enable convenient and pervasive casual user-created dynamic 3D hologram models and 3D contents, which were previously difficult to generate with conventional 3D content generation solutions.

In order to initiate creation of holographic contents for HoloWalks or other mixed-reality applications, two methods of ubiquitous and rapid three-dimensional model content generation and robust social sharing of holographic contents by casual (i.e. non-graphics expert) consumers can be utilized in accordance with various embodiments of the invention. A first method of ubiquitous and rapid three-dimensional model content generation involves a dedicated 3D content generation studio (i.e. "HoloPortal") that allows a casual consumer to walk into a HoloPortal facility to capture multi-angle video feeds from professionally-installed multiple cameras surrounding a targeted area in the HoloPortal for a dynamic 3D model generation from onsite graphics processing units. On the other hand, a second method of ubiquitous and rapid three-dimensional model content generation involves a plurality of consumer cameras at any location of a casual consumer's choice to capture multi-angle video feeds around a target object, wherein the multi-angle video feeds are subsequently transmitted to a cloud computing resource specializing in 3D graphics processing to generate a dynamic 3D model. As described previously, this second method of the dynamic 3D model generation is called "HoloCloud."

Once dynamic 3D hologram models are generated by a HoloPortal system or a HoloCloud system, they can be incorporated or synthesized into various electronic applications, such as mixed-reality applications, virtual reality applications, augmented reality applications, 3D animation movies, and 3D-printed physical 3D models. For example, a HoloWalks creator application module can select and insert a dynamic 3D hologram model into a mixed-reality artificial layer as a tour guide at a popular tourist spot, wherein the tour guide is visibly intermixed with and/or juxtaposed to real physical objects at the popular tourist spot, when a tourist is wearing a head-mounted display device executing a corresponding HoloWalks viewer application. In another example, a physical 3D model made of plastic, metallic, or composite materials may be created by a 3D printer. Furthermore, the dynamic 3D models can be uploaded, listed, and shared on an electronic 3D model and content sharing platform that connects mixed-reality experience designers, mixed-reality experience viewers, content distributors, and/or service providers. The electronic 3D model and content sharing platform may also provide paid viewing as well as complimentary viewing features based on content access permission parameters configured by the mixed-reality experience designers and/or the content distributors.

Various embodiments of 3D mixed-reality space and experience construction sharing systems and related methods of operating such systems described herein provide significant advantages to conventional augmented reality or virtual reality applications. For instance, a novel 3D mixed-reality space and experience construction sharing system, implemented in accordance with an embodiment of the invention, is able to provide a novel part-holographic and part-physical object-based immersive user experience environment that enables an intermixture of computer-generated lifelike holographic objects and real objects to be synchronized and correlated to a particular physical space (i.e. as a "mixed-reality" (MR) environment) for vividly-interactive user experiences during the user's visit to the particular physical space.

Furthermore, the novel 3D mixed-reality space and experience construction sharing system, implemented in accordance with an embodiment of the invention, is able to accommodate a user interaction designer to construct and configure a mixed-reality (MR) environment and various potential user interactivities for a geographic landmark, a museum, or another tourist destination, and subsequently share the MR environment with other user interaction designers and users (e.g. tourists) who visit that tourist destination.

Moreover, the novel 3D mixed-reality space and experience construction sharing system, implemented in accordance with an embodiment of the invention, is able to provide a method of operating the three-dimensional mixed-reality space and experience construction sharing system (i.e. the "HoloWalks" system) for MR experience designers and MR experience viewers (e.g. tourists, visitors, etc.) at a particular geographic landmark, a museum, or another tourist destination.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the claims.

What is claimed is:

1. A three-dimensional (3D) mixed-reality space and experience construction sharing system comprising:
   a dedicated physical studio space for 3D hologram generation, wherein the dedicated physical studio space includes a center stage, a plurality of cameras surrounding the center stage, and a 3D reconstruction electronic system integrating a memory unit and at least one of a CPU and a GPU, wherein the 3D reconstruction electronic system is configured to capture, calculate, construct, and generate graphical transformation of a target object to create a user-controllable 3D holographic object;
   a head-mounted display device connected to the 3D reconstruction electronic system;
   a walk-through map creation engine and a 3D map database executed in a computer server connected to the 3D reconstruction electronic system and one or more portable electronic devices utilized by a mixed-reality experience designer and a mixed-reality experience viewer, wherein the walk-through map creation engine intelligently and automatically generates a 3D map of a designer-specified physical space with a mixed-reality artificial layer incorporating virtual coordinates correlated to the designer-specified physical space, when the mixed-reality experience designer walks through the designer-specified physical space while wearing the head-mounted display device connected to the walk-through map creation engine, and wherein the 3D map newly constructed by the walk-through map creation engine is subsequently stored in the 3D map database;

a user experience choreography engine and a 3D holographic database executed in the computer server, wherein the user experience choreography engine allows the mixed-reality experience designer to retrieve the 3D map from the 3D map database and select and position the user-controllable 3D holographic object retrieved from the 3D holographic database within the virtual coordinates of the mixed-reality artificial layer, which is graphically superimposed on the designer-specified physical space, and wherein the user experience choreography engine also provides a timed choreographic sequence of interactions in a mixed-reality experience scenario incorporated into multiple mixed-reality (MR) artificial layers, wherein each mixed-reality artificial layer embeds a custom time-sequenced interactivity among the user-controllable 3D holographic object, physical objects present in the designer-specified physical space, and the mixed-reality experience viewer immersed in the timed choreographic sequence of interactions in the mixed-reality experience scenario while also being present at the designer-specified physical space;

a mixed-reality experience designer creator module containing a mixed-reality experience construction interface, which is executed and displayed on the one or more portable electronic devices utilized by the mixed-reality experience designer to construct the timed choreographic sequence of interactions in the mixed-reality experience scenario for the mixed-reality experience viewer, wherein the mixed-reality experience designer module is connected to the walk-through map creation engine, the 3D map database, the user experience choreography engine, and the 3D holographic database; and a mixed-reality experience viewer module connected to the mixed-reality experience designer creator module, and containing a viewer's mixed-reality visualization interface executed and displayed by the one or more portable electronic devices utilized by the mixed-reality experience viewer, wherein the mixed-reality experience viewer immerses in a mixed-reality environment that intermixes the user-controllable 3D holographic object on the virtual coordinates of the mixed-reality artificial layer with one or more physical objects present in the designer-specified physical space.

2. The three-dimensional (3D) mixed-reality space and experience construction sharing system of claim 1, further comprising additional mixed-reality computer-generated objects and mixed-reality humanized holographic figures generated by the 3D reconstruction electronic system, wherein the additional mixed-reality computer-generated objects and the mixed-reality humanized holographic figures are utilized by the mixed-reality experience designer creator module for additional placements and choreographed interactivity constructions in the timed choreographic sequence of interactions in the mixed-reality experience scenario, which also integrates a physical presence of various nearby physical objects in the designer-specified physical space.

3. The three-dimensional (3D) mixed-reality space and experience construction sharing system of claim 1, further comprising mixed-reality holographic app and service toolkits that enable the mixed-reality experience designer to create, modify, and manage a variety of 3D mixed-reality space and experience applications and service offerings, wherein the mixed-reality holographic app and the service toolkits are integrated into or operatively connected to the walk-through map creation engine and the user experience choreography engine.

4. The three-dimensional (3D) mixed-reality space and experience construction sharing system of claim 1, further comprising a wireless data network connecting the dedicated physical studio space, the 3D reconstruction electronic system, the walk-through map creation engine, the 3D map database, the user experience choreography engine, the 3D holographic database, the mixed-reality experience designer creator module, and the mixed-reality experience viewer module.

5. The three-dimensional (3D) mixed-reality space and experience construction sharing system of claim 1, wherein the one or more portable electronic devices utilized by the mixed-reality experience designer and the mixed-reality experience viewer are at least one of head-mounted display devices, smart phones, tablet computers, or notebook computers.

6. The three-dimensional (3D) mixed-reality space and experience construction sharing system of claim 1, wherein the 3D reconstruction electronic system in the dedicated physical studio space is configured to perform silhouette extractions, 3D voxel generation, 3D mesh generation, and texture and detail-adding operations to create the user-controllable holographic object that resembles the target object.

7. The three-dimensional (3D) mixed-reality space and experience construction sharing system of claim 1, wherein the user-controllable holographic object is a holographic tour guide, a holographic museum curator, or a holographic travel assistant, which is juxtaposed to the one or more physical objects present in the designer-specified physical space.

8. The three-dimensional (3D) mixed-reality space and experience construction sharing system of claim 7, wherein the one or more physical objects are geographic landmarks, museum exhibits, artifacts, or points of interest, and wherein the designer-specified physical space is a popular tourist spot or a renowned travel destination that contains the geographic landmarks, the museum exhibits, the artifacts, or the points of interest.

9. The three-dimensional (3D) mixed-reality space and experience construction sharing system of claim 3, wherein the variety of 3D mixed-reality space and experience applications and service offerings include holographic mixed-reality (HMR) tour guide applications to integrate holographic travel guides or holographic curators in the timed choreographic sequence of interactions in the mixed-reality experience scenario generated by the mixed-reality experience designer creator module for the mixed-reality experience viewer.

10. The three-dimensional (3D) mixed-reality space and experience construction sharing system of claim 1, wherein choreographing of the user-controllable 3D holographic object within the virtual coordinates of the mixed-reality artificial layer involves defining a sequence and a roadmap of possible interactions between the user-controllable 3D holographic object and the mixed-reality experience viewer in the designer-specified physical space.

11. The three-dimensional (3D) mixed-reality space and experience construction sharing system of claim 1, wherein the user-controllable 3D holographic object incorporates artificial intelligence to provide naturalized and dynamic question-and-answer and conversational capabilities between the user-controllable 3D holographic object and the mixed-reality experience viewer.

\* \* \* \* \*